(12) United States Patent
Tachibana

(10) Patent No.: US 8,346,311 B2
(45) Date of Patent: Jan. 1, 2013

(54) AUDIO SIGNAL PROCESSING APPARATUS, AUDIO SIGNAL PROCESSING METHOD, AND COMMUNICATION TERMINAL

(75) Inventor: Makoto Tachibana, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 672 days.

(21) Appl. No.: 12/535,846

(22) Filed: Aug. 5, 2009

(65) Prior Publication Data

US 2010/0056198 A1 Mar. 4, 2010

(30) Foreign Application Priority Data

Sep. 1, 2008 (JP) .................................. 2008-223835

(51) Int. Cl.
*H04B 1/38* (2006.01)
(52) U.S. Cl. ........................ 455/570; 455/63.1
(58) Field of Classification Search .................. 455/501, 455/63.1, 569.1, 569.2, 570; 379/388.01, 379/388.02, 388.06, 390.01, 390.02, 390.03, 379/390.04, 406.01, 406.08
See application file for complete search history.

(56) References Cited

U.S. PATENT DOCUMENTS 4,715,063 A * 12/1987 Haddad et al. ........... 379/390.01

FOREIGN PATENT DOCUMENTS

| JP | 7-221832 | 8/1995 |
| JP | 11-261355 | 9/1999 |
| JP | 2004-289614 | 10/2004 |

OTHER PUBLICATIONS

Japanese Office Action mailed Jul. 19, 2012, in Japanese Patent Application No. 2008-223835, filed Sep. 1, 2008.

* cited by examiner

*Primary Examiner* — Ping Hsieh
(74) *Attorney, Agent, or Firm* — Oblon, Spivak, McClelland, Maier & Neustadt, L.L.P.

(57) ABSTRACT

An audio signal processing apparatus includes a band signal component extraction unit for extracting signal components in a predetermined frequency band from an audio signal input by an audio collection unit for collecting at least an outgoing call audio upon an audio phone call, a stationary signal component extraction unit for extracting a stationary signal component from the signal components, a signal adjustment unit having a level adjustment function of adjusting an output signal level with respect to an input signal level and an input and output characteristics change function of changing input and output characteristics upon level adjustment in the level adjustment function through a control signal and configured to set an incoming call audio signal upon the audio phone call as the input signal, and a control signal generation unit for generating the control signal for changing the input and output characteristics by using the stationary signal component.

13 Claims, 25 Drawing Sheets

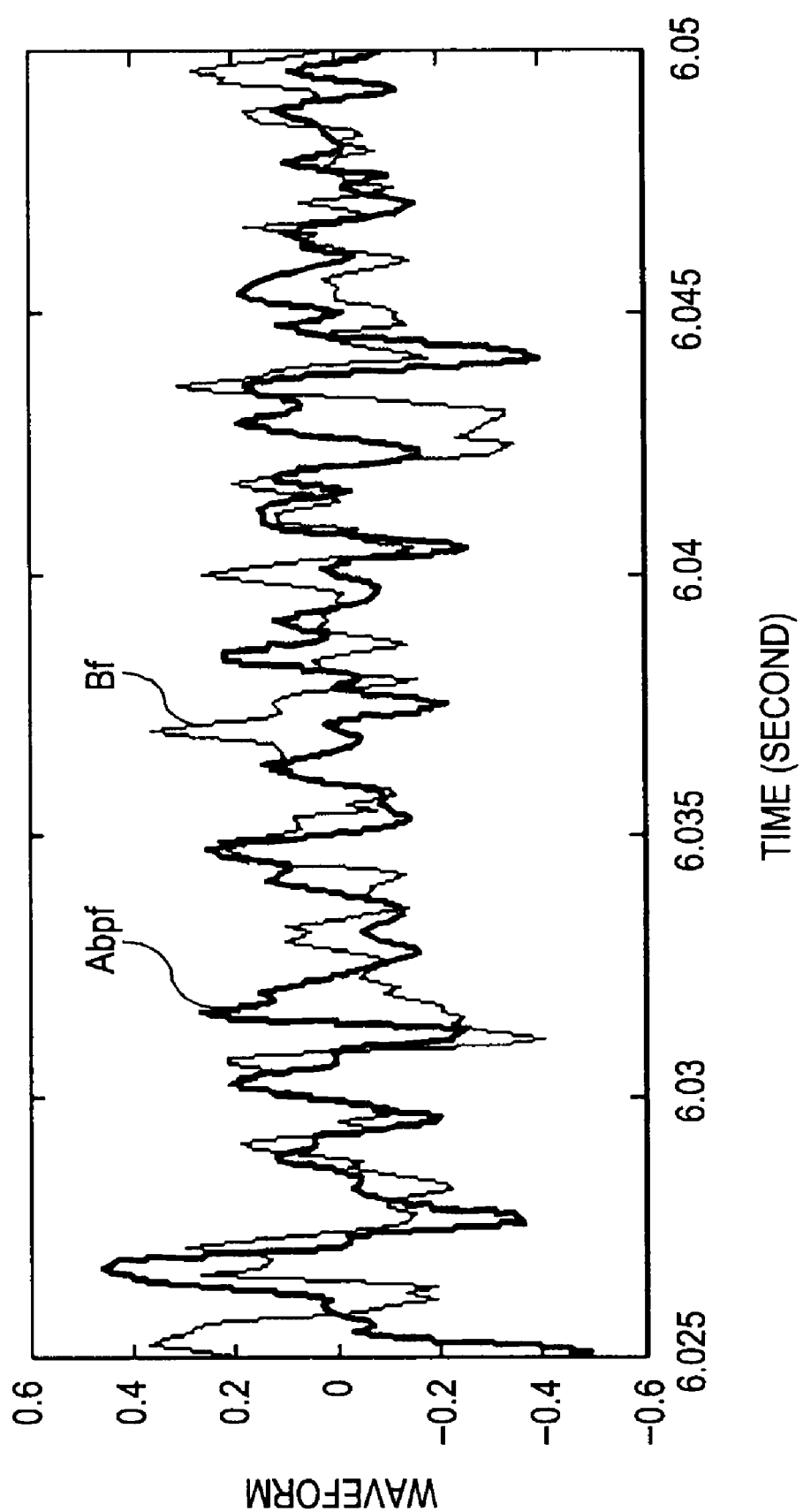

FIG. 22

| CONTROL SIGNAL (dBfs) | VARIABLE HINGE POINT (input_dB, output_dB) |
|---|---|
| TO −40 | −20, −20 |
| −40 TO −35 | −20, −18.75 |
| −35 TO −30 | −20, −17.5 |
| −30 TO −25 | −20, −16.25 |
| −25 TO −20 | −20, −15 |
| −20 TO −15 | −20, −13.75 |
| −15 TO −10 | −20, −12.5 |
| −10 TO −5 | −20, −11.25 |
| −5 TO | −20, −10 |

FIG. 23

| CONTROL SIGNAL (dBfs) | VARIABLE HINGE POINT (input_dB, output_dB) |
|---|---|
| TO −20 | −20, −20 |
| −20 TO −18 | −20, −19 |
| −18 TO −16 | −20, −18 |
| −16 TO −14 | −20, −17 |
| −14 TO −12 | −20, −16 |
| −12 TO −10 | −20, −15 |
| −10 TO −8 | −20, −14 |
| −8 TO −6 | −20, −13 |
| −6 TO −4 | −20, −12 |
| −4 TO −2 | −20, −11 |
| −2 TO 0 | −20, −10 |

AUDIO SIGNAL PROCESSING APPARATUS, AUDIO SIGNAL PROCESSING METHOD, AND COMMUNICATION TERMINAL

BACKGROUND OF THE INVENTION

1. Field of the Invention

The present invention relates to an audio signal processing apparatus and an audio signal processing method for making it easier to hear a voice on an incoming call sent via a communication network such as a mobile phone network and a communication terminal such as a mobile phone terminal enabling an audio phone call.

2. Description of the Related Art

Up to now, for a case in which an audio phone call is carried out via a communication network such as a mobile phone network, for example, a technology is proposed for improving the ease of hearing a voice on the phone call in an environment with an ambient noise by applying a predetermined signal processing on a phone call audio signal on an audio reception side.

For example, Japanese Unexamined Patent Application Publication No. 7-221832 (FIG. 1) discloses a technology for improving the ease of hearing by comparing frequency characteristics of an ambient noise and an incoming call audio and changing the frequency characteristic of the incoming call audio.

SUMMARY OF THE INVENTION

However, as described above, in order to compare the frequency characteristics of the ambient noise and the incoming call audio and change the frequency characteristic of the incoming call audio, a large number of processing are carried out such as a signal analysis on both the ambient noise and the incoming call audio and a comparison between these analysis results. For this reason, for example, there is a problem that burden becomes large for an apparatus having a limited processing performance such as a mobile phone terminal.

The mobile phone terminal is used in various environments in general. Among the use environments, in particular, in a case where the mobile phone terminal is used in an environment such as a party venue or a pub, voice from other people who surround a talker having a phone call becomes a source of noise. However, a technology for making it easier to hear the incoming call audio has not existed yet in the use of the mobile phone terminal under the environment where the noise from the other people exists in this way.

The present invention has been proposed in view of the above-mentioned circumstances, and it is desirable to provide an audio signal processing apparatus, an audio signal processing method, and a communication terminal in which it is possible to make it easier to hear a phone call audio (voice on an incoming call) with a small processing amount, in particular, an audio signal processing apparatus, an audio signal processing method, and a communication terminal in which it is possible to make it easier to hear the voice on the phone call even under the environment where voice from other people other than a talker having a phone call becomes a source of noise.

According to an embodiment of the present invention, there is provided an audio signal processing apparatus including: a band signal component extraction unit configured to extract signal components in a predetermined frequency band from an audio signal input by audio collection means configured to collect at least an outgoing call audio upon an audio phone call; a stationary signal component extraction unit configured to extract at least a stationary signal component from the signal components extracted by the band signal component extraction unit; a signal adjustment unit provided with a level adjustment function of adjusting an output signal level with respect to an input signal level and an input and output characteristics change function of changing input and output characteristics upon level adjustment in the level adjustment function through a control signal and configured to set an incoming call audio signal upon the audio phone call as the input signal; and a control signal generation unit configured to generate the control signal for changing the input and output characteristics of the signal adjustment unit by using at least the stationary signal component extracted by the stationary signal component extraction unit.

That is, according to the embodiment of the present invention, the signal components in the predetermined frequency band are extracted from the audio signal input by the audio collection means. For the predetermined frequency band, the frequency band of the human voice can be exemplified. Among the signal components in the predetermined frequency band, in particular, the stationary signal component can be considered as the signal component of the voice from surrounding other people except for the voice of the talker having the phone call. Therefore, according to the embodiment of the present invention, as the stationary signal component is used, the level of the incoming call audio signal upon the audio phone call is adjusted. To be more specific, in accordance with the size of the level of the signal component, the dynamics on the audio reception side is controlled.

In addition, according to a further embodiment, in the audio signal processing apparatus, the band signal component extraction unit may include a first filter designed to extract a signal waveform in the first frequency band from an input audio signal, a second filter designed to extract a signal waveform in the second frequency band from the input audio signal, a first envelope detector configured to detect an envelope of a signal waveform after pass of the first filter, and a second envelope detector configured to detect an envelope of a signal waveform after pass of the second filter, output a signal waveform after the envelop detection by the first envelope detector as the signal components in the first frequency band, and output a signal waveform after the envelop detection by the second envelope detector as the signal components in the second frequency band, the stationary signal component extraction unit may include a mute unit configured to mute the signal waveform after the envelop detection by the first envelope detector and a mute control unit configured to cancel mute of the mute unit when a signal level of the signal waveform after the envelop detection exceeds a predetermined threshold and also this state carries on for a predetermined period of time and to enable the mute of the mute unit when the signal level dips from the predetermined threshold after the mute cancellation and output an output waveform of the mute unit as the stationary signal component, and the control signal generation unit may use the stationary signal component composed of a signal waveform output from the mute unit and the signal components in the second frequency band composed of the signal waveform after the envelop detection by the second envelope detector to generate the control signal.

That is, according to the embodiment of the present invention, as the signal components in the predetermined frequency band, the signal components in the first frequency band and the second frequency band are extracted. For the first frequency band, the frequency band of the human voice can be exemplified. For the second frequency band, a frequency band lower than the frequency band of the human voice can be exemplified. Then, according to the embodiment of the present invention, the control signal is generated on the basis of the signal components having passed the mute unit among the signal components in the first frequency band and the signal components in the second frequency band.

According to the embodiment of the present invention, on the basis of the signal components in the predetermined frequency band extracted from the input audio signal, the level of the incoming call audio signal upon the audio phone call is adjusted. That is, for example, when the ambient environment noise is large, a level adjustment is carried out in a manner that the level of the incoming call audio signal is increased. Thus, it is possible to make it easier to hear the phone call audio (in particular, the voice on the incoming call) with a small processing amount. In particular, according to the embodiment of the present invention, the frequency band of the human voice is used for the predetermined frequency band. Thus, at the time of the call under the environment where the human voice is included as the noise source, it is possible to make it easier to hear the incoming call audio.

In addition, for the predetermined frequency band, for example, the first frequency band of the human voice and the second frequency band which is lower than the first frequency band are respectively extracted, and temporal delays used for analysis in the respective bands are minimized and combined with each other, so that it is possible to apply to the ambient environment noise in a wide band, and also the level adjustment of the incoming call audio signal at a faster response time can be realized.

BRIEF DESCRIPTION OF THE DRAWINGS

FIG. 12 is a waveform diagram of an audio signal waveform input from a microphone and a past BPF pass signal waveform obtained by from the audio signal waveform after passing through the band-pass filter in the noise detection unit;

FIG. 22 shows an example of a relation between the control signal and the hinge point in a case where the input and output characteristics of the auto level controller are controlled through a digital processing;

FIG. 23 shows another example of a relation between the control signal and the hinge point in a case where the input and output characteristics of the auto level controller are controlled through the digital processing;

DESCRIPTION OF THE PREFERRED EMBODIMENTS

Hereinafter, with reference to the drawings, an embodiment of the present invention will be described.

It should be noted that according to the present embodiment, a mobile phone terminal is described as an example of the present invention, but of course, a content described herein are merely an example, and the present invention is not limited to this example for sure.

Schematic Configuration of the Mobile Phone Terminal

Figure 1:
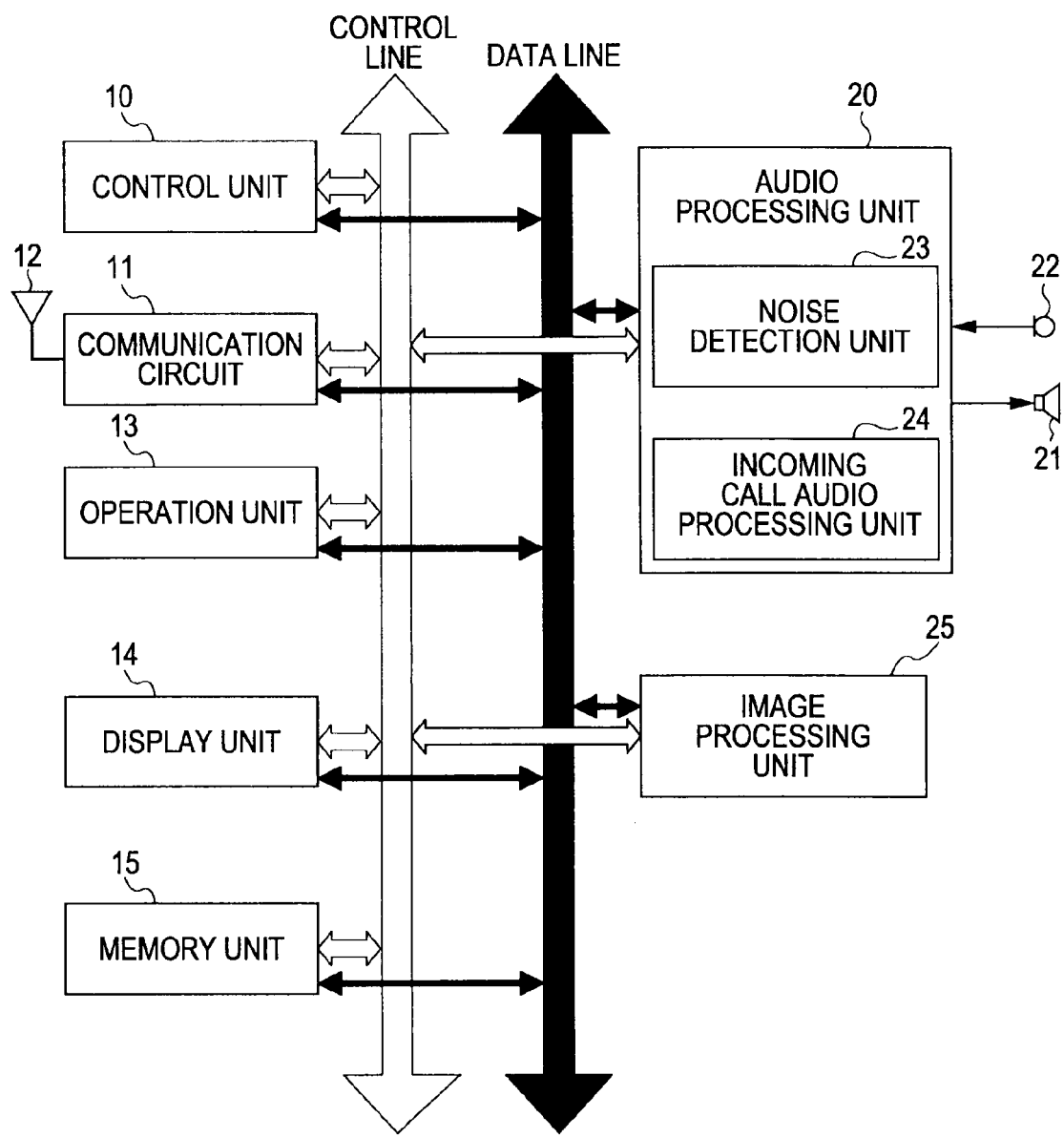
FIG. 1 is a block diagram of a schematic configuration of a mobile phone terminal according to an embodiment of the present invention.

FIG. 1 shows a schematic configuration of the mobile phone terminal according to the present embodiment.

In FIG. 1, a communication antenna 12 is, for example, a built-in antenna and carries out a transmission of signal waves for a phone call or a packet communication such as an electronic mail. A communication circuit 11 performs a frequency conversion, a modulation, a demodulation, and the like for a transmission signal.

A control unit 10 is composed of a CPU (central processing unit) and performs a control on a communication in the communication circuit 11, a control on an audio processing, a control on an image processing, various other signal processings, controls on the respective units, and the like. Also, the control unit 10 performs an execution on various control programs and application programs accumulated in a memory unit 15, various data processings accompanying the execution, and the like.

A speaker 21 is composed of a speaker for an incoming call provided in the mobile phone terminal and a speaker for outputting a ringer (ring alert), an alarm sound, a warning sound, a reproduced music, a digital audio, an audio of a reproduced video, and the like. The speaker 21 converts the audio signal supplied from an audio processing unit 20 into an acoustical wave to be output into the air.

A microphone 22 is a microphone for collecting an outgoing call and an external audio and is configured to convert an acoustical wave into an audio signal and input the audio signal to the audio processing unit 20.

The audio processing unit 20 amplifies an audio data generated through a predetermined audio processing such as the demodulation after digital/analog conversion and outputs the audio signal after the amplification to the speaker 21. Also, the audio processing unit 20 performs amplification and analog/digital conversion on the input audio signal supplied from the microphone 22 and applies a predetermined audio processing such as encoding on the audio data after the analog/digital conversion. Also, in particular, in a case where the mobile phone terminal according to the embodiment of the present invention, the audio processing unit 20 is provided with a noise detection unit 23 and an incoming call audio processing unit 24 are provided. Detailed configurations and operations of the noise detection unit 23 and the incoming call audio processing unit 24 will be described below.

An operation unit 13 is composed of various operation elements including various keys such as numeric keypads, a call key, and a call end/power key and various operation elements such as an arrow key and a jog dial which are provided on an enclosure (not shown) of the mobile phone terminal according to the present embodiment and an operation signal generator configured to generate operation signals when these operation elements are operated.

A display unit 14 includes a display device such as, for example, a liquid crystal display or an organic EL (ElectroLuminescent) display and a display driver circuit for the display. On the basis of an image signal supplied from an image processing unit 25, the display unit 14 displays various characters such as, for example, an electronic mail and a message on the display and displays a still image, a video image, and the like.

The image processing unit 25 performs a processing of generating image signals for the characters, symbols, images, etc., which are displayed on the display unit 14. Also, under the control of the control unit 10, the image processing unit 25 also displays various user interface screens, web pages, and the like.

The memory unit 15 includes a ROM (Read Only Memory) and a RAM (Random Access Memory). The ROM includes a rewritable storage medium such as a NAND-type flash memory, and also stores, for example, an OS (Operating System) program, a control program for the control unit 10 to control the various units, various application program such as, for example, in addition to compressed and encoded music data contents and video image data contents, various initial setting values, font data, respective dictionary data, machine name information, and terminal identification information. The RAM stores data as a work area for the control unit 10 to perform various data processings as the occasion demands.

In addition, although not shown in FIG. 1, the mobile phone terminal according to the present embodiment is also provide with respective components provided to a general mobile phone terminal such as a digital camera unit for an image pickup of a photographic image, an LED (light emitting diode) for key illumination, an incoming call light, and the like, a drive unit for the LED, a battery for supplying electric power to the respective units, a power management IC unit configured to control the electric power of the battery, a close range wireless communication unit configured to perform a close range wireless communication based on so called Bluetooth (registered trademark) system, a UWB (Ultra Wide Band) system, a wireless LAN (Local Area Network), a non-contact communication processing unit provided with a non-contact IC card function and a reader writer function, a GPS (Global Positioning System) communication unit, an external memory slot, a digital broadcasting reception tuner unit, an AV codec unit, and a timer (clock unit).

Figure 2:
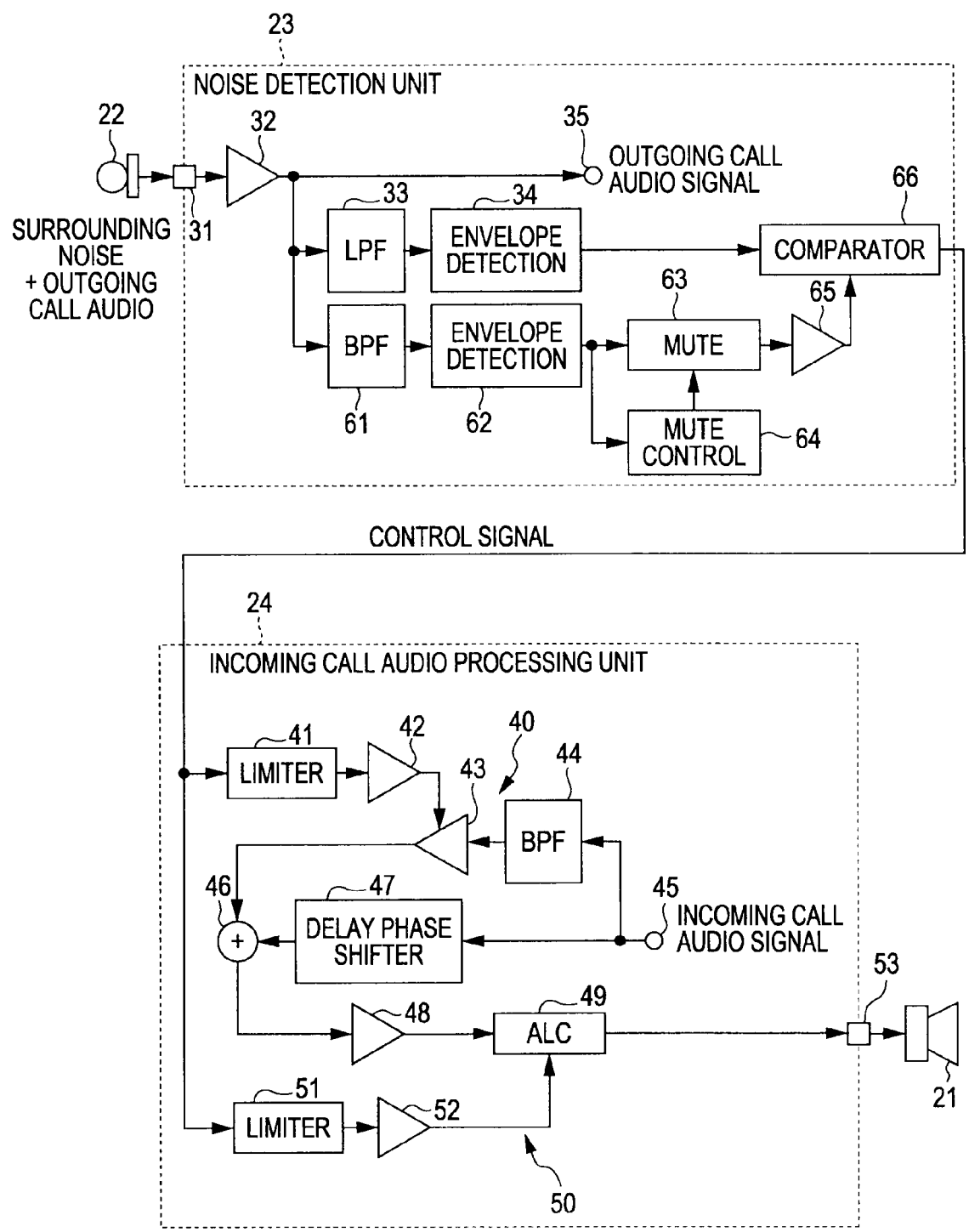
FIG. 2 is a block circuit diagram of detailed configurations of a noise detection unit and an incoming call audio processing unit provided in an audio processing unit of the mobile phone terminal according to the present embodiment.

Description for Details of the Noise Detection Unit and the Incoming Call Audio Processing Unit and Operations FIG. 2 shows detail configurations of the noise detection unit 23 and the incoming call audio processing unit 24 provided in the audio processing unit 20 of the mobile phone terminal according to the present embodiment. It should be noted that hereinafter, for convenience of the description, the example has been described in which the analog audio signal is processed, but the embodiment of the present invention can also of course be applied to a case in which a digitalized audio signal is processed.

In the mobile phone terminal according to the present embodiment, the incoming call audio processing unit 24 includes a dynamics adjustment unit 50 and a formant adjustment unit 40. The dynamics adjustment unit 50 is an input and output characteristic change function unit configured to when the phone call is carried out by the mobile phone terminal according to the present embodiment, control the input and output characteristics (dynamics) of the incoming call audio signal sent from the other party of the phone call in accordance with the control signal from the noise detection unit 23. The formant adjustment unit 40 is a level adjustment function unit configured to perform a processing of emphasizing the second formant which is in particular hardly overlapped with the peak of the ambient environment noise among formants included in the incoming call audio signal which will be described below. That is, the formant adjustment unit 40 functions as an equalizer configured to lift up a contour component of the voice on the incoming call.

The noise detection unit 23 is composed of an ambient environment noise detection unit and a control signal generation unit. When the phone call is carried out by the mobile phone terminal according to the present embodiment, the noise detection unit 23 detects the ambient environment noise level included in the audio signal collected by the microphone 22 and generates a control signal for controlling the input and output characteristics of the dynamics adjustment unit 50 from the ambient environment noise level.

That is, the mobile phone terminal according to the present embodiment adjusts the level of the incoming call audio signal upon the audio phone call on the basis of the ambient environment noise level. To be more specific, for example, when the ambient environment noise level is large, by controlling the dynamics on the audio reception side so as to increase the level of the incoming call audio signal, it is possible to make it easier to hear the phone call audio (in particular, the voice on the incoming call) with a small processing amount.

In addition, in the mobile phone terminal according to the present embodiment, the noise detection unit 23 also detects, for example, the ambient environment noise caused by the voice of the other people except for the voice of the talker during the phone call, and generates the control signal on the basis of the ambient environment noise caused by the voice of the other people.

With this configuration, in the mobile phone terminal according to the present embodiment, even in a case where the ambient environment noise caused by the voice of the other people exists, it is possible to make it easier to hear the incoming call audio.

Hereinafter, the above-mentioned configuration for making it easier to hear the incoming call audio and the operation will be specifically described.

In FIG. 2, an audio signal output from the microphone 22 used for the phone call is input to a microphone audio input terminal 31 of the noise detection unit 23 provided in the audio processing unit 20. The audio signal input to the microphone audio input terminal 31 is amplified by an amplifier 32 and thereafter output as an outgoing call audio signal from an outgoing call audio output terminal 35 to a general circuit unit for an outgoing call audio processing.

In addition, according to the present embodiment, the audio signal amplified by the amplifier 32 is branched from an output path for the above-mentioned outgoing call audio and introduced into a low-pass filter (LPF) 33 and a band-pass filter 61 provided in parallel with each other.

The respective branch paths to the low-pass filter 33 and the band-pass filter 61 are provided for examining how much the ambient environment noise is contained in the audio signal input from the microphone 22. In the case of the present embodiment, although a detail will be described below, the branch path on the low-pass filter 33 side is provided for examining the ambient environment noise from which the human voice is substantially removed. On the other hand, the branch path on the band-pass filter 61 side is provided for examining the ambient environment noise caused by the voice of the other people except for the voice of the talker during the phone call.

Figure 3:
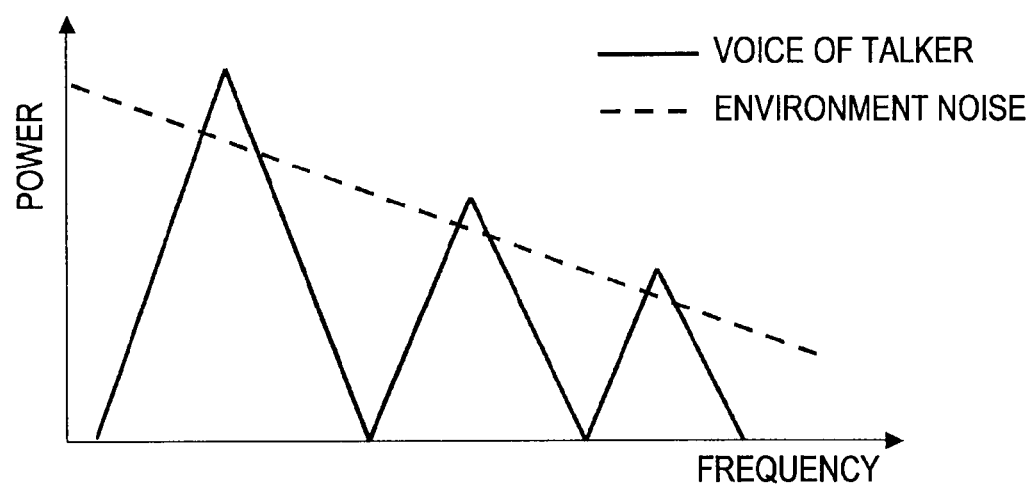
FIG. 3 is a schematic diagram used for describing a frequency characteristic of a human voice.

Herein, in the frequency characteristic of the human voice, as shown in a characteristic curve represented by the solid line in FIG. 3, particular peaks (formants) exist. Although an individual variation exists, the frequency of the formant has large two peaks (formants) about between 300 Hz to 3.4 kHz. The first formant exists in the vicinity of 500 kHz to 1 kHz, and the second formant exists in the vicinity of 1.5 kHz to 3 kHz.

On the other hand, variations of the ambient environment noise are considerable depending on an environment, but the frequency characteristic of the ambient environment noise in the general use environment for the mobile phone terminal often attenuates from a lower band towards a higher hand as shown in a characteristic curve represented by the dotted line in FIG. 3.

Figure 4:
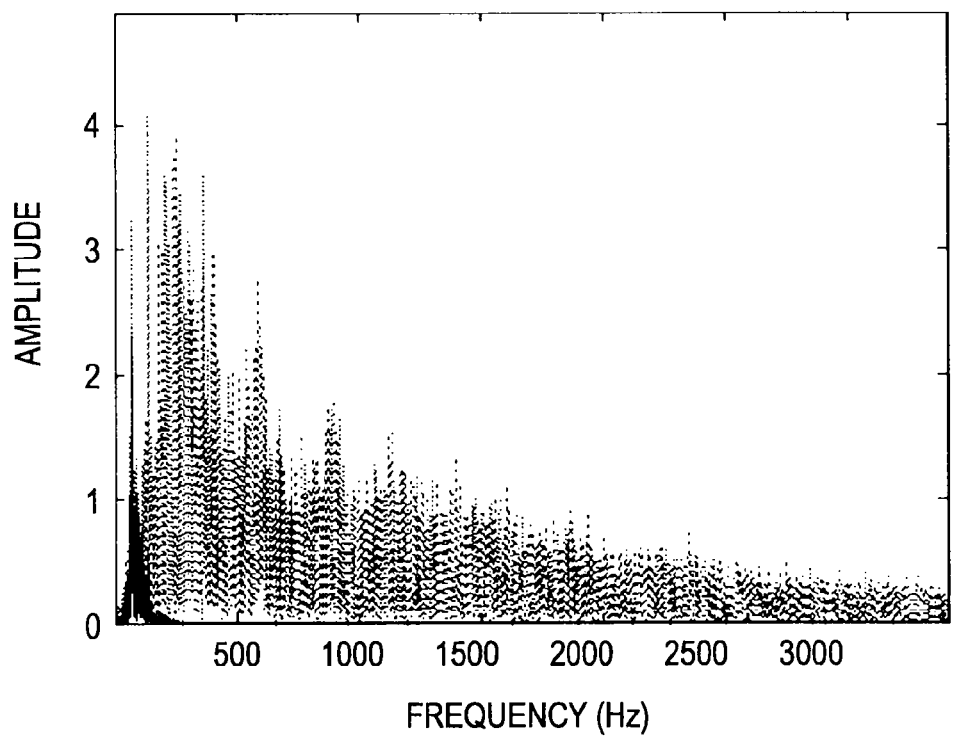
FIG. 4 is an amplitude-frequency characteristic diagram of an actually measured incoming call audio signal including an ambient environment noise.
Figure 5:
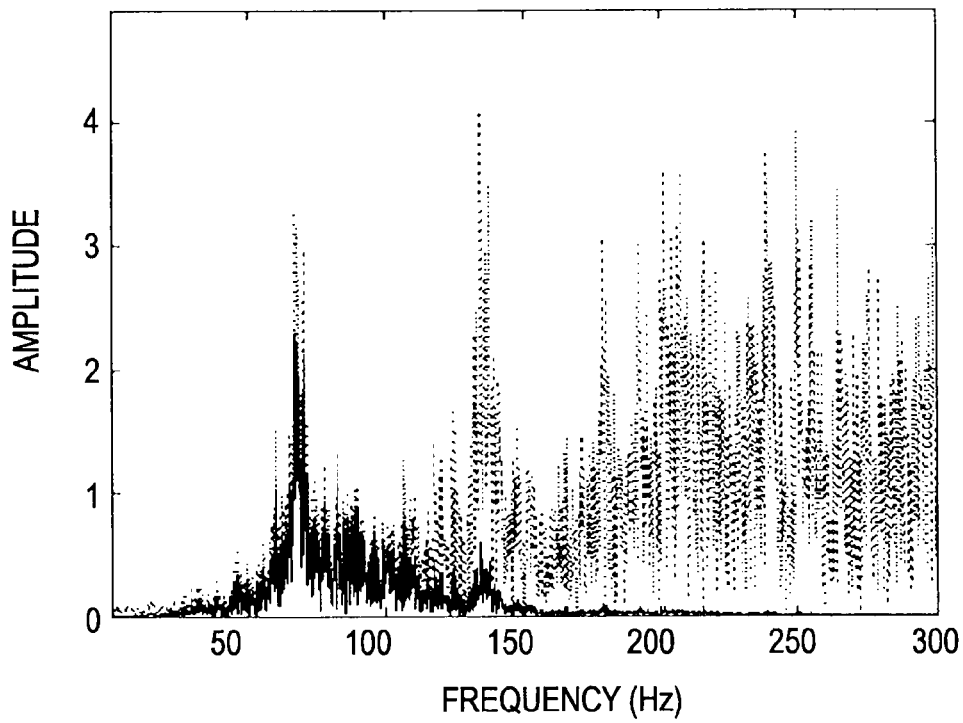
FIG. 5 is an amplitude-frequency characteristic diagram of the incoming call audio signal of FIG. 4 in which 0 Hz to 300 Hz are expanded.
Figure 6:
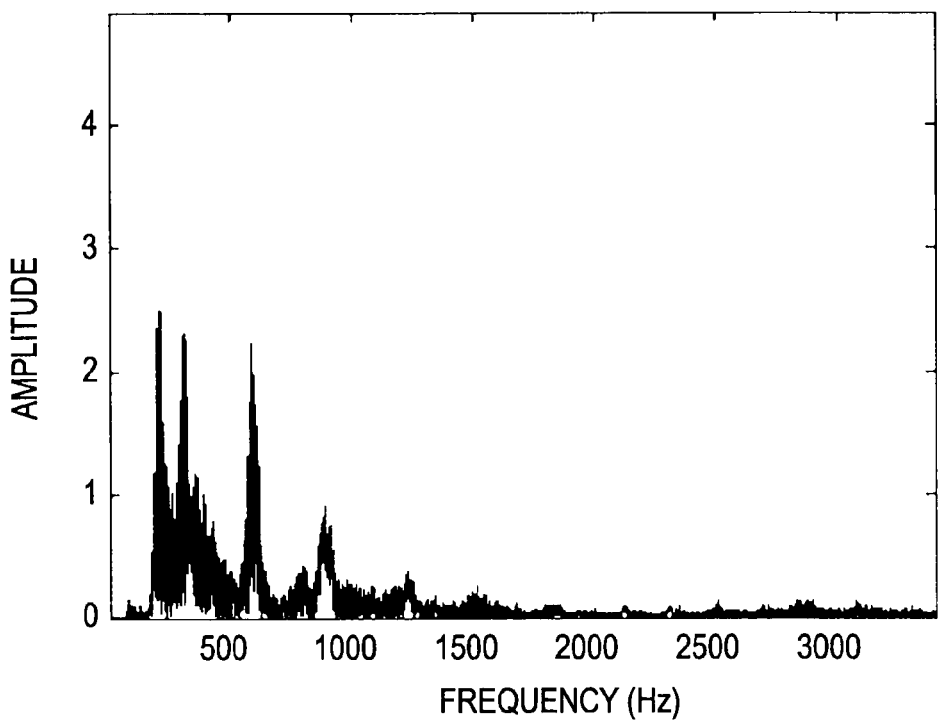
FIG. 6 is an amplitude-frequency characteristic diagram of a formant of the actually measured incoming call audio signal.
Figure 7:
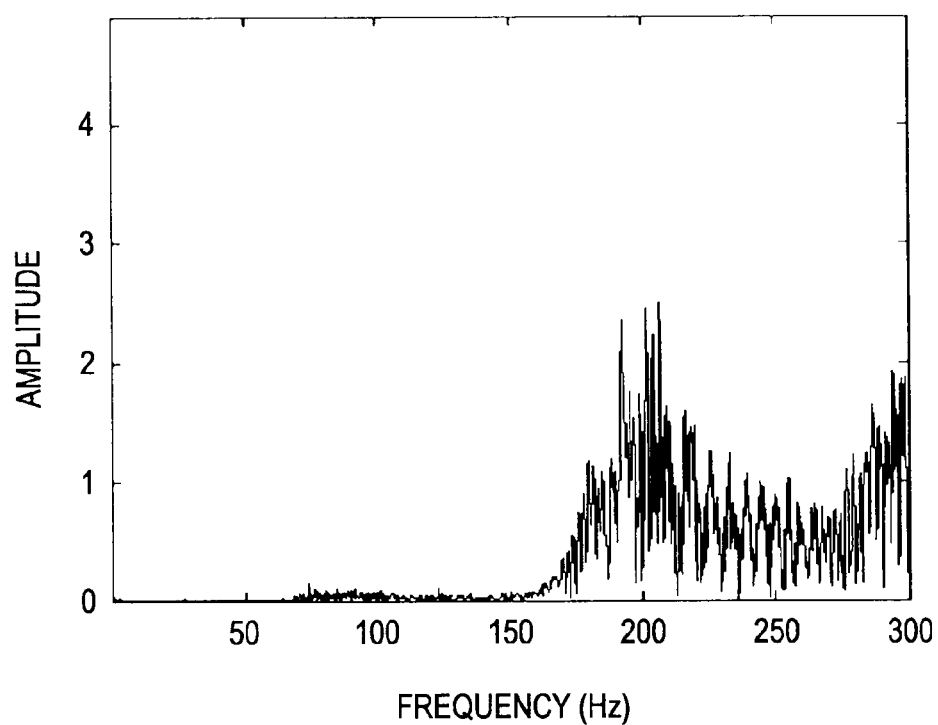
FIG. 7 is an amplitude-frequency characteristic diagram of the incoming call audio signal of FIG. 4 in which 0 Hz to 300 Hz are expanded.

It should be noted that FIG. 4 is an amplitude-frequency characteristic diagram of an actually measured incoming call audio signal including the ambient environment noise, and FIG. 5 is an amplitude-frequency characteristic diagram of the incoming call audio signal of FIG. 4 in which 0 Hz to 300 Hz are expanded. Also, FIG. 6 is an amplitude-frequency characteristic diagram of a formant of the actually measured incoming call audio signal, and FIG. 7 is an amplitude-frequency characteristic diagram of the incoming call audio signal of FIG. 4 in which 0 Hz to 300 Hz are expanded.

Figure 8:
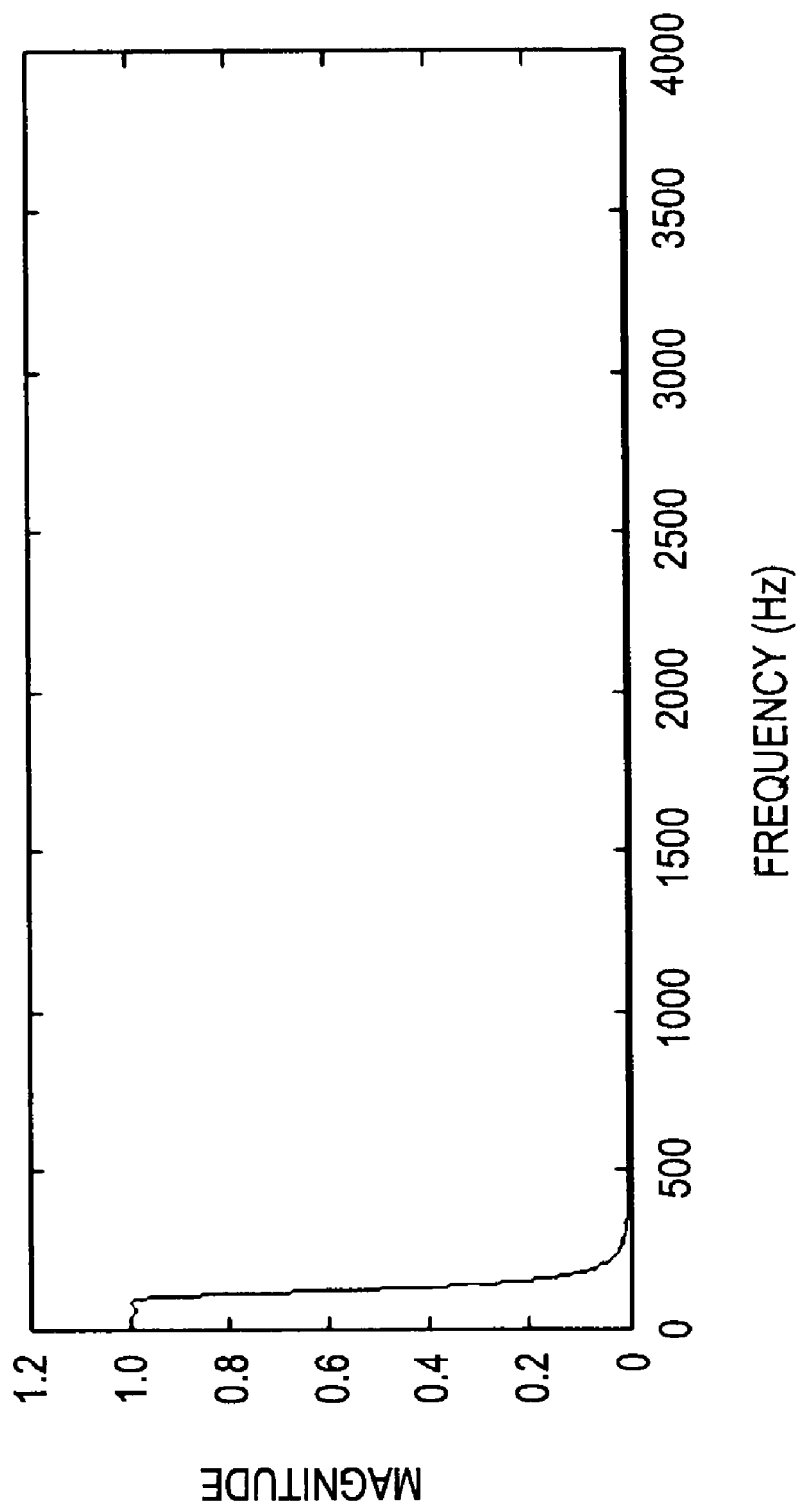
FIG. 8 is a characteristic diagram of a frequency characteristic of a low-pass filter in the noise detection unit.
Figure 9:
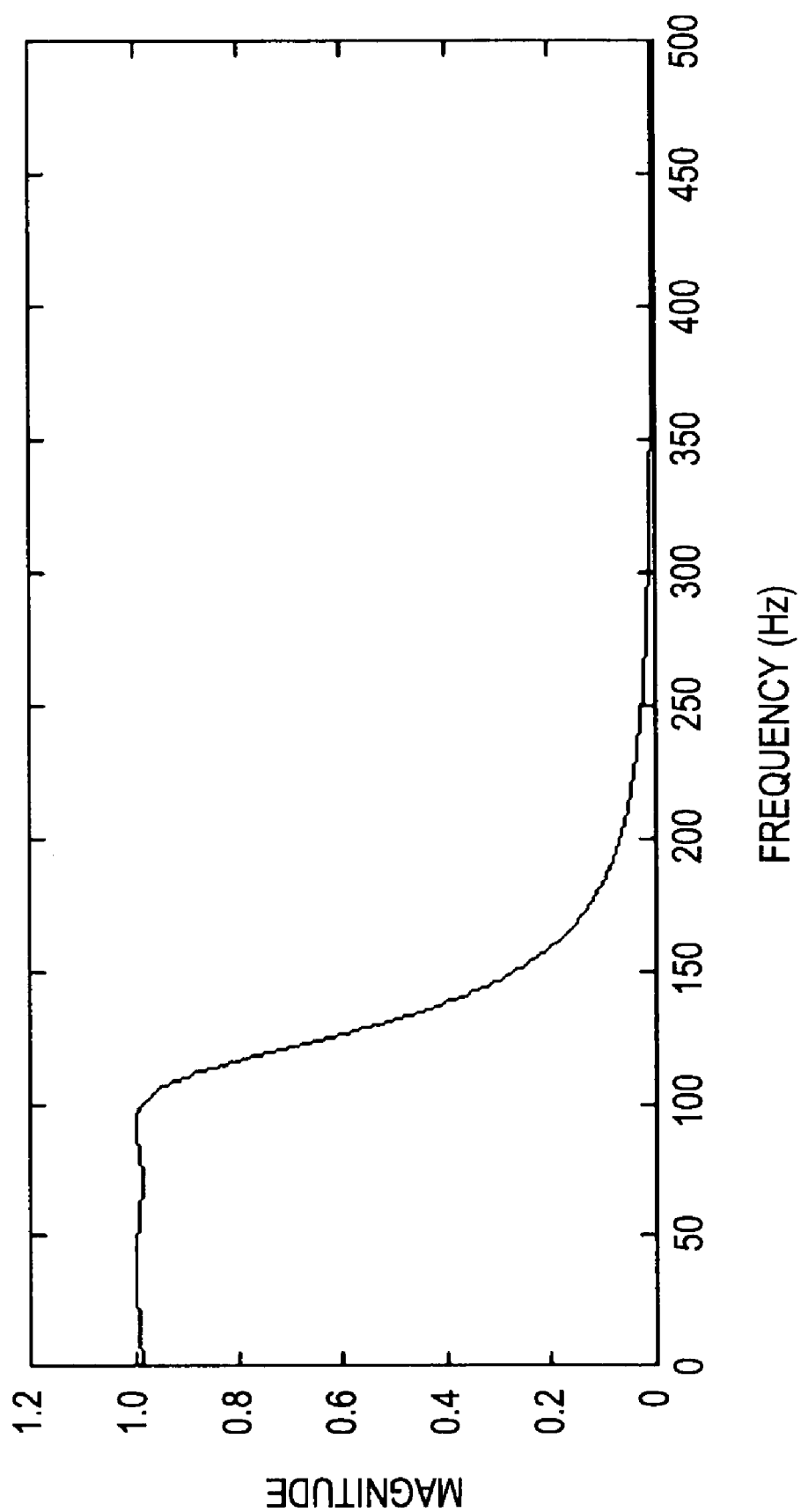
FIG. 9 is a characteristic diagram in which a low frequency band part is expanded in particular among the frequency characteristic of the low-pass filter in the noise detection unit.

In view of the above, the mobile phone terminal according to the present embodiment is provided with the low-pass filter 33 having the characteristics shown, for example, in FIGS. 8 and 9 for identifying how much the ambient environment noise from which the human voice is substantially removed is contained in the input audio signal from the microphone 22. It should be noted that FIG. 9 shows the expanded low frequency band part of FIG. 8 by changing the scale size of the x axis of FIG. 8 (frequency axis). That is, according to the present embodiment, for the low-pass filter 33, a filter is used which is provided with the relatively precipitous characteristic shown, for example, in FIGS. 8 and 9 and in which, as in FIG. 3, a band lower than the first formant in the frequency characteristic of the human voice is set as a cutoff frequency (second frequency band of the embodiment of the present invention). It should be noted that according to the present embodiment, for the low-pass filter 33, a filter is used which has, for example, the cutoff frequency of 50 Hz to 140 Hz (in particular, about 100 Hz in the example of FIGS. 8 and 9) and about a fourth-order Chebyshev characteristic.

Figure 10:
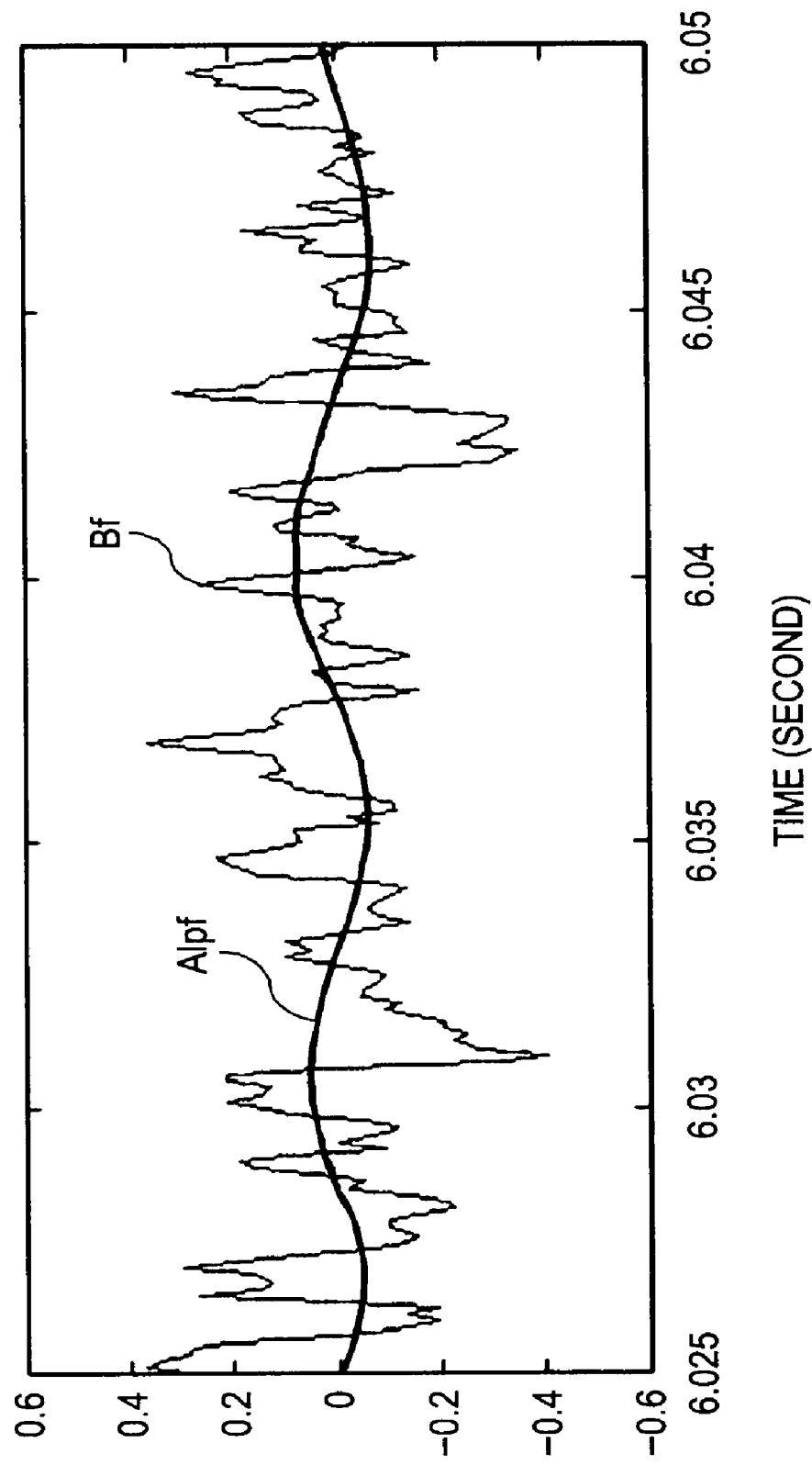
FIG. 10 is a waveform diagram of an audio signal waveform input from a microphone and a post LPF pass signal waveform obtained from the audio signal waveform after passing through the low-pass filter in the noise detection unit.

According to the present embodiment, as the low band pass by the low-pass filter 33 is carried out, as shown in FIG. 10, an audio signal waveform Bf input from the microphone 22 is set as a post LPF pass signal waveform Alpf. That is, the post LPF pass signal waveform Alpf is a signal waveform obtained by removing band components where components of the human voice are extremely rare (that is, the signal component of the ambient environment noise from which the human voice is substantially removed) from the output signal of the microphone 22.

The abovementioned signal passing through the low-pass filter 33 (that is, the signal component of the ambient environment noise from which the human voice is substantially removed) is sent to an envelope detector 34 as shown in FIG. 2.

In the envelope detector 34, by performing the envelope detection on the signal having passed through the low-pass filter 33, to be more specific, by averaging and sampling the post LPF pass signal waveform Alpf for every certain time interval, a signal representing an energy rough transient of the above-mentioned ambient environment noise is generated. That is, according to the present embodiment, the output signal of the envelope detector 34 is a signal representing the result of the examination on how much the ambient environment noise from which the human voice is substantially removed is contained in the audio signal input from the microphone 22. It should be noted that the temporal frequency (cycle of averaging for every certain time interval) for detecting the above-mentioned energy transient is detected in the envelope detector 34 is not limited herein, but the temporal frequency is desirably set in accordance with the processing time unit used in the incoming call audio processing unit 24 in the later stage (for example, 100 msec).

Incidentally, the above-mentioned ambient environment noise components extracted by the low-pass filter 33 are limited to noise components in a pitch extent lower than the human voice. It should be noted that the mobile phone terminal is used, for example, in an environment such as a party venue or a pub. That is, in a case where the mobile phone terminal is used in such an environment, the voice of surrounding other people other than the talker having the phone call is also contained in the above-mentioned ambient environment noise.

On the other hand, in a case where the phone call is carried out by the mobile phone terminal under the environment where the human voice becomes the noise source, in order to execute the above-mentioned processing for the adjustment on the level of the incoming call audio signal for improving the ease of hearing the voice on the phone call, the voice on the phone call and the noise component due to the voice of surrounding other people are distinguished from each other. That is, on the basis of the voice on the phone call, if the level adjustment for emphasizing the incoming call audio signal is performed, the sound quality of the incoming call voice is deteriorated. Thus, for example, a processing is performed for detecting the voice of other people as the noise component in a period in which only the voice of surrounding other people exists except for a period in which the voice on the phone call exists.

In view of the above, according to the present embodiment, the branch path of the band-pass filter 61 in the noise detection unit 23 is provided for identifying how much the ambient environment noise caused by the voice of the other people except for the voice of the talker during the phone call is contained in the audio signal input from the microphone 22.

Figure 11:
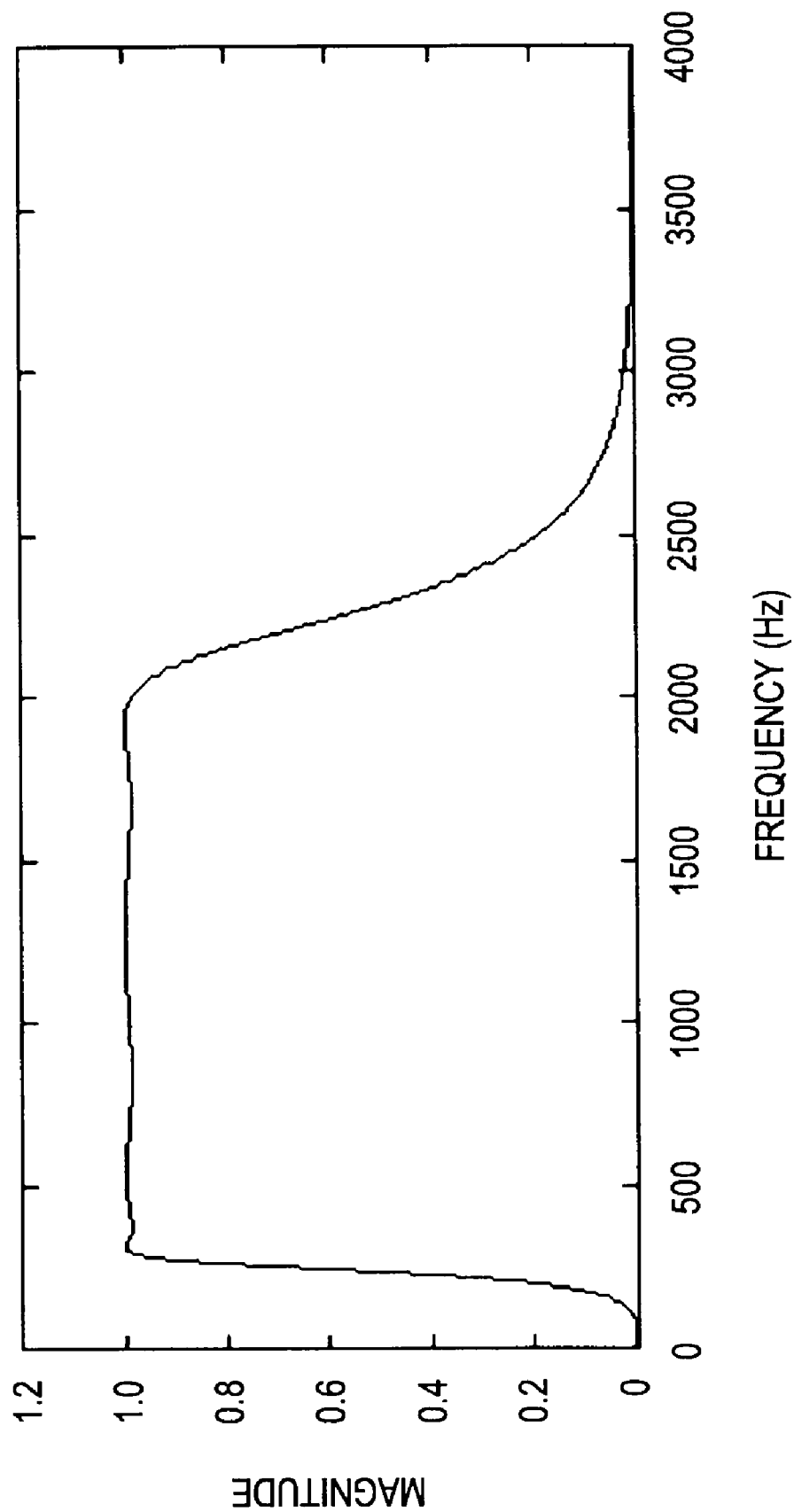
FIG. 11 is a characteristic diagram of a frequency characteristic of a band-pass filter in the noise detection unit.

The band-pass filter 61 has a characteristic shown, for example, in FIG. 11. That is, the band-pass filter 61 is a filter provided with a characteristic of allowing pass of a relatively high band from about 200 Hz to several kHz including the band of the human voice (first frequency band according to the embodiment of the present invention) as shown in FIG. 11.

According to the present embodiment, as the band pass is performed through the band-pass filter 61, as shown in FIG. 12, the audio signal waveform Bf input from the microphone 22 is set as a post BPF pass signal waveform Abpf. That is, the post BPF pass signal waveform Abpf is a signal waveform obtained by extracting the band component close to the human voice component (that is, the signal component including the ambient environment noise due to the human voice) from the output signal of the microphone 22.

Herein, as described above, in a case where the frequency band component close to the human voice component is used for the detection of the ambient environment noise, there is a problem that the voice component of the talker itself during the phone call is also detected as the ambient environment noise.

In order to solve this problem, the mobile phone terminal according to the present embodiment is provided with a mute control circuit 64 and a mute circuit 63 in the branch path on the band-pass filter 61 side as shown in FIG. 2.

That is, the voice of the talker during the phone call and the voice of other people functioning as the ambient environment noise are thought to have substantially the same voice frequency bands but to have a difference in temporal continuity. To be more specific, as words are used during the phone call, the voice of the talker has less temporal continuity due to a break between sentences, intake of breath, call from the other party on the phone call, and the like and changes unsteadily. In contrast, the voice of other people functioning as the ambient environment noise becomes more stationary with fewer temporal breaks as the number of other people is increased and the noise becomes higher.

The mute control circuit 64 and the mute circuit 63 are provided to distinguish the audios from the difference in the above-mentioned temporal continuity of the voices.

While referring back to the description of FIG. 2, the signal passing through the band-pass filter 61 (the signal component of the human voice band) is input via an envelope detector 62 similar to the envelope detector 34 described above to the mute circuit 63 and the mute control circuit 64.

In the initial state, the mute circuit 63 is set to mute the input signal (mute ON), and when a mute OFF signal is supplied from the mute control circuit 64, the above-mentioned mute is cancelled (mute OFF).

When the signal level from the envelope detector 62 exceeds a predetermined threshold, and the state carries on for a predetermined period of time (about several seconds), the mute control circuit 64 outputs the above-mentioned mute signal to the mute circuit 63. That is, the mute control circuit 64 measures the continuous time in a state in which the output signal level of the envelope detector 62 exceeds the above-mentioned threshold, and when the states carries on for the above-mentioned predetermined period of time, the mute control circuit 64 outputs the mute OFF signal.

Also, after the mute of the mute circuit 63 is cancelled (after a mute cancellation signal is output), when the output signal level from the envelope detector 62 dips from the above-mentioned predetermined threshold, the mute control circuit 64 outputs a mute ON signal for immediately enabling the mute of the mute circuit 63 (mute ON).

That is, according to the present embodiment, in the branch path of the band-pass filter 61, in the case where the input signal to the mute control circuit 64 is the non-stationary signal without the temporal continuity, that is, the signal corresponding to the audio signal of the talker on the phone call, the mute circuit 63 is put into the mute ON state, and the output signal of the envelope detector 62 is not output to the later stage of the mute circuit 63. On the other hand, the input signal to the mute control circuit 64 is the stationary signal with the temporal continuity, that is, the signal corresponding to the voice of other people functioning as the ambient environment noise, the mute circuit 63 is put into the mute OFF state, and the output signal of the envelope detector 62 is output to the later stage of the mute circuit 63.

The output signal of the mute circuit 63 is sent to a comparator 66. In addition, the output signal of the envelope detector 34 on the branch path on the low-pass filter 33 side is also supplied to the comparator 66. It should be noted that a mixing volume circuit 65 is provided between the mute circuit 63 and the comparator 66. The mixing volume circuit 65 is provided for adjusting the balance of signal intensities on both the branch path on the low-pass filter 33 side and the branch path on the band-pass filter 61 side.

The comparator 66 compares the levels between the output signal of the envelope detector 62 via the mute circuit 63 in the branch path on the band-pass filter 61 side and the output signal of the envelope detector 34 in the branch path on the low-pass filter 33 side described above and outputs the higher signal to the incoming call audio processing unit 24 in a later stage as the control signal. It should be noted that the level comparison in the comparator 66 is carried out, for example, in synchronization with the cycle of the above-mentioned certain time interval in the envelope detector 34 and the envelope detector 62.

Figure 13A:
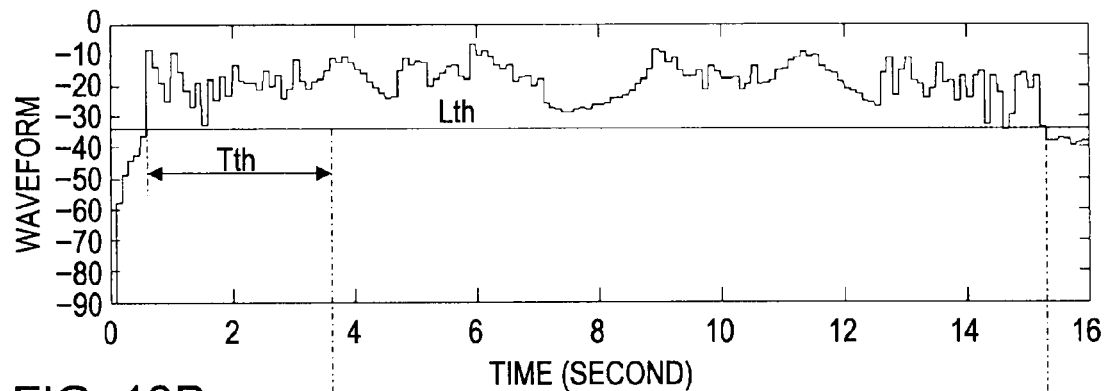
FIGS. 13A to 13C are waveform diagrams of an output signal waveform example of an envelope detector on a branch path side of the band-pass filter, an output signal waveform example of a mute circuit, and an output signal waveform example of a mixing volume circuit.
Figure 13B:
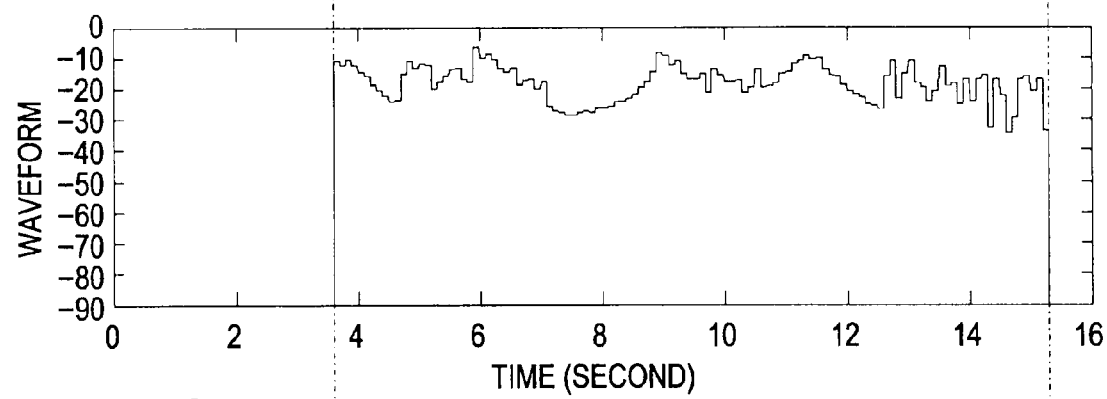
Figure 13C:
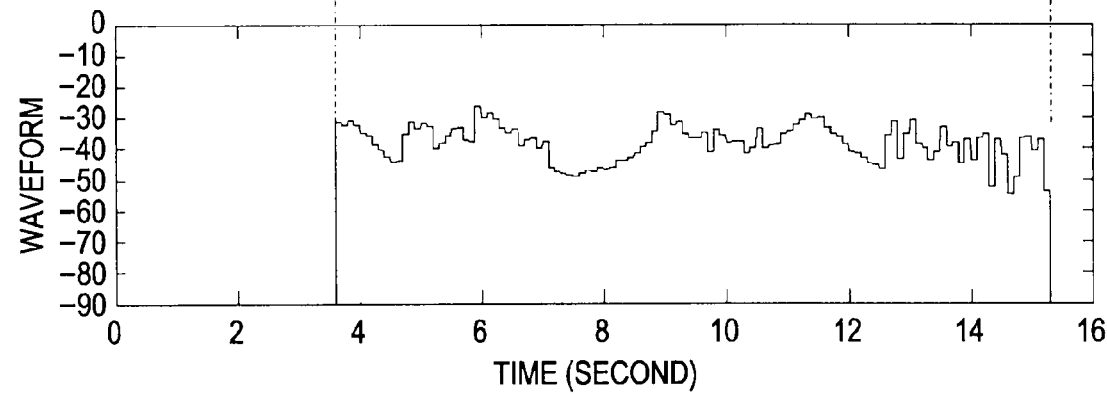

FIG. 13A shows an example of the output signal waveform of the envelope detector 62, FIG. 13B shows an example of the output signal waveform of the mute circuit 63, and FIG. 13C shows an example of the output signal waveform of the mixing volume circuit 65.

As shown in the examples of FIGS. 13A to 13C, in a case where input signals to the mute circuit 63 and the mute control circuit 64 are waveform signals shown in FIG. 13A, when a state in which the level of the signal waveform exceeds a predetermined threshold Lth of FIG. 13A continues for a predetermined time Tth, the mute control circuit 64 outputs the mute OFF signal to the mute circuit 63. With this configuration, a waveform signal shown in FIG. 13B is output from the mute circuit 63 in the mute OFF state.

Also, after that, in a case where the input signal to the mute control circuit 64 dips from the above-mentioned predetermined threshold Tth, the mute control circuit 64 immediately outputs the mute ON signal to the mute circuit 63. With this configuration, the signal waveform is not output from the mute circuit 63 in the mute ON state as shown in FIG. 13B.

Figure 14A:
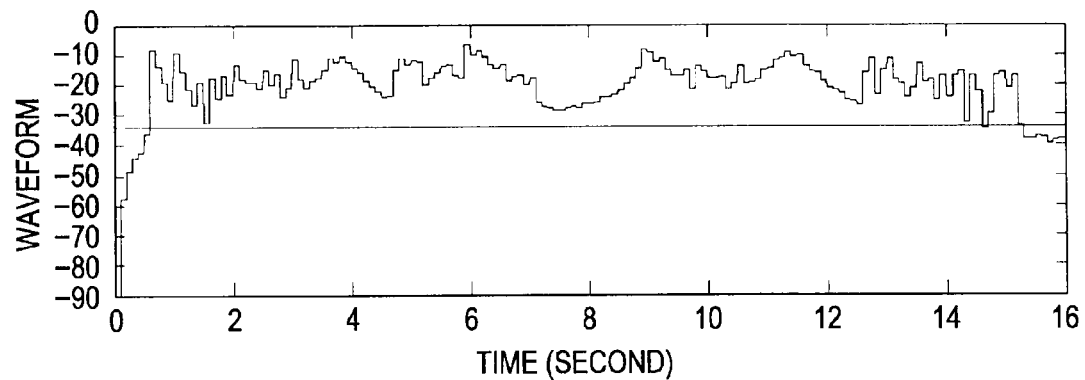
FIGS. 14A to 14C are waveform diagrams of an output signal waveform example of an envelope detector on a branch path side of the low-pass filter, an output signal waveform example of the mixing volume circuit on the branch path side of the band-pass filter, and an output signal waveform example of a comparator.
Figure 14B:
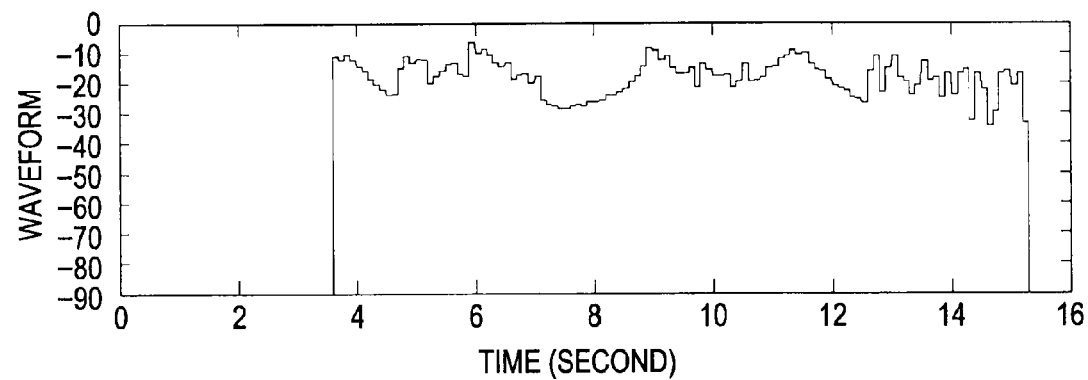
Figure 14C:
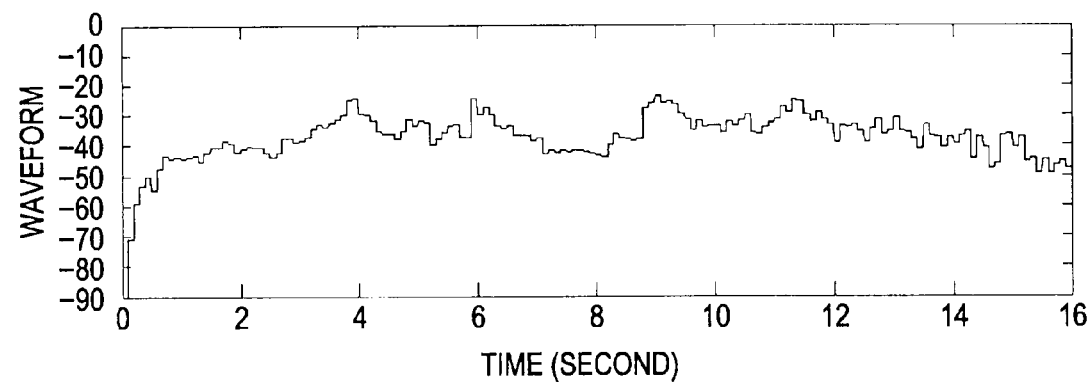

Also, FIG. 14A shows an example of the output signal waveform of the envelope detector 34 on the branch path side of the low-pass filter 33, FIG. 14B shows an example of the output signal waveform of the mixing volume circuit 65, and FIG. 14C shows an example of the output signal waveform (control signal) of the comparator 66.

As shown in the examples of FIGS. 14A to 14C, the result of the level comparison between the output signal from the mixing volume circuit 66 on the branch path on the band-pass filter 61 side and the output signal of the envelope detector 34 on the branch path on the low-pass filter 33 side, the higher signal is output from the comparator 66.

As described above, according to the present embodiment, among the control signal based on the ambient environment noise from which the human voice is substantially removed in the branch path on the low-pass filter 33 side and the control signal based on the ambient environment noise due to the voice of other people in the branch path on the band-pass filter 61 side, the signal having the higher signal level is output to the incoming call audio processing unit 24.

With this configuration, for example, in a case where the ambient environment noise due to the human voice is larger than the ambient environment noise from which the human voice is substantially removed, in the incoming call audio processing unit 24, the level of the incoming call audio signal adjustment is carried out on the basis of the control signal in accordance with the ambient environment noise level due to the human voice. On the other hand, in a case where the ambient environment noise from which the human voice is substantially removed is larger than the ambient environment noise due to the human voice, in the incoming call audio processing unit 24, the level of the incoming call audio signal adjustment is carried out on the basis of the control signal in accordance with the ambient environment noise level for which the human voice is substantially removed.

In addition, according to the present embodiment, the period in which the voice of the talker on the phone call exists and the period in which only the ambient environment noise due to the voice of other people exists can be clearly distinguished from each other. Thus, in particular, in the period in which the voice of the talker on the phone call exists, on the basis of the control signal in accordance with the ambient environment noise level from which the human voice is substantially removed, the level of the incoming call audio signal adjustment is performed in the incoming call audio processing unit 24.

In addition, according to the present embodiment, the ambient environment noise from which the human voice is substantially removed and the ambient environment noise due to the human voice can be detected in parallel. Then, the control signal based on the ambient environment noise due to the human voice is generated in the branch path on the band-pass filter 61 side while being delayed by at least a predetermined time, and on the other side, the control signal based on the ambient environment noise from which the human voice is substantially removed is regularly generate in the branch path on the low-pass filter 33 side. That is, in the incoming call audio processing unit 24 according to the present embodiment, while utilizing the promptness of the response speed at the time of the level adjustment based on the control signals regularly generated from the ambient environment noise from which the human voice is substantially removed, it is possible to perform the level adjustment on the basis of the ambient environment noise due to the human voice.

Description of a Configuration and an Operation of the Dynamics Adjustment Unit

Hereinafter, detailed configurations and operations of the dynamics adjustment unit 50 and the formant adjustment unit 40 in the incoming call audio processing unit 24 will be described.

First, the dynamics adjustment unit 50 will be described, and thereafter the formant adjustment unit 40 will be described.

In the incoming call audio processing unit 24, the incoming call audio signal sent from the circuit unit for the normal incoming call audio processing (not shown) is input to an incoming call audio input terminal 45.

This incoming call audio signal is sent to a band-pass filter (BPF) 44 which will be described below of the formant adjustment unit 40 and also to a delay phase shifter unit 47.

The incoming call audio signal via the delay phase shifter unit 47 which will be described below and also via an adder 46 which will be described below is amplified in an amplifier 48 of the dynamics adjustment unit 50 as the occasion demands and then input to an auto level controller (ALC) 49.

Also, the control signal output from the comparator 66 of the noise detection unit 23 is subjected to the level limit for a part exceeding a regulated level by a limiter 51 of the dynamics adjustment unit 50 and is further subjected to the level adjustment by an amplifier 52 as the occasion demands to be thereafter sent to the auto level controller 49. It should be noted that in a case where the signal waveform of the control signal output from the comparator 66 is a waveform shown, for example, in FIG. 15, the control signal waveform subjected to the level limit by the limiter 51 of the dynamics adjustment unit 50 and the level adjustment by the amplifier 52 becomes a waveform shown, for example, in FIG. 16.

The output signal of the auto level controller 49 is output to via an incoming call audio output terminal 53 to the speaker 21 for the incoming call. It should be noted that a detailed description of the auto level controller 49 according to the present embodiment will be described below.

Figure 16:
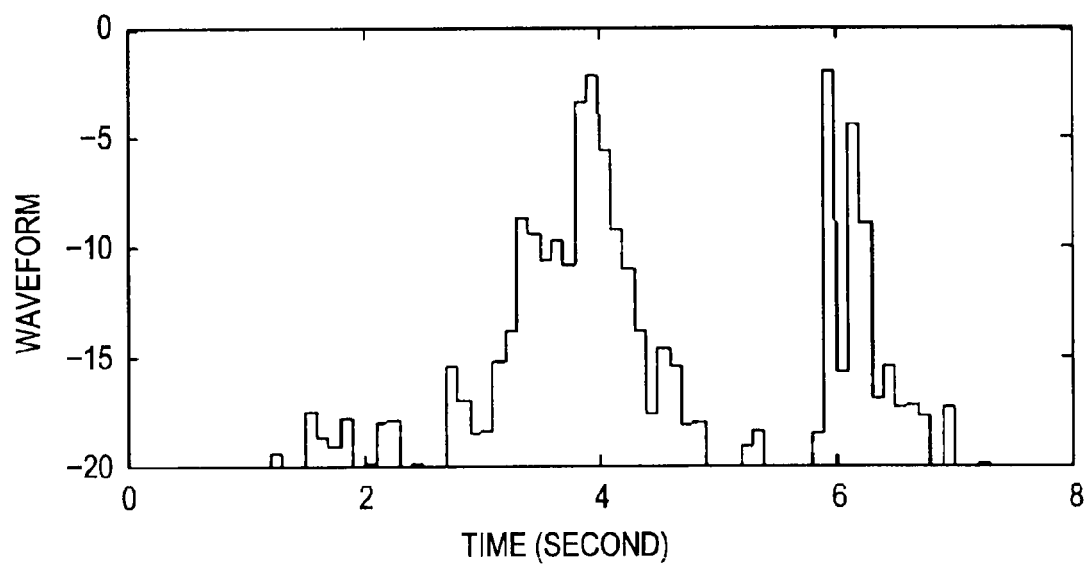
FIG. 16 is a waveform diagram of a waveform example in which the control signal output from the noise detection unit passes through a limiter and an amplifier of a dynamics adjustment unit.
Figure 17:
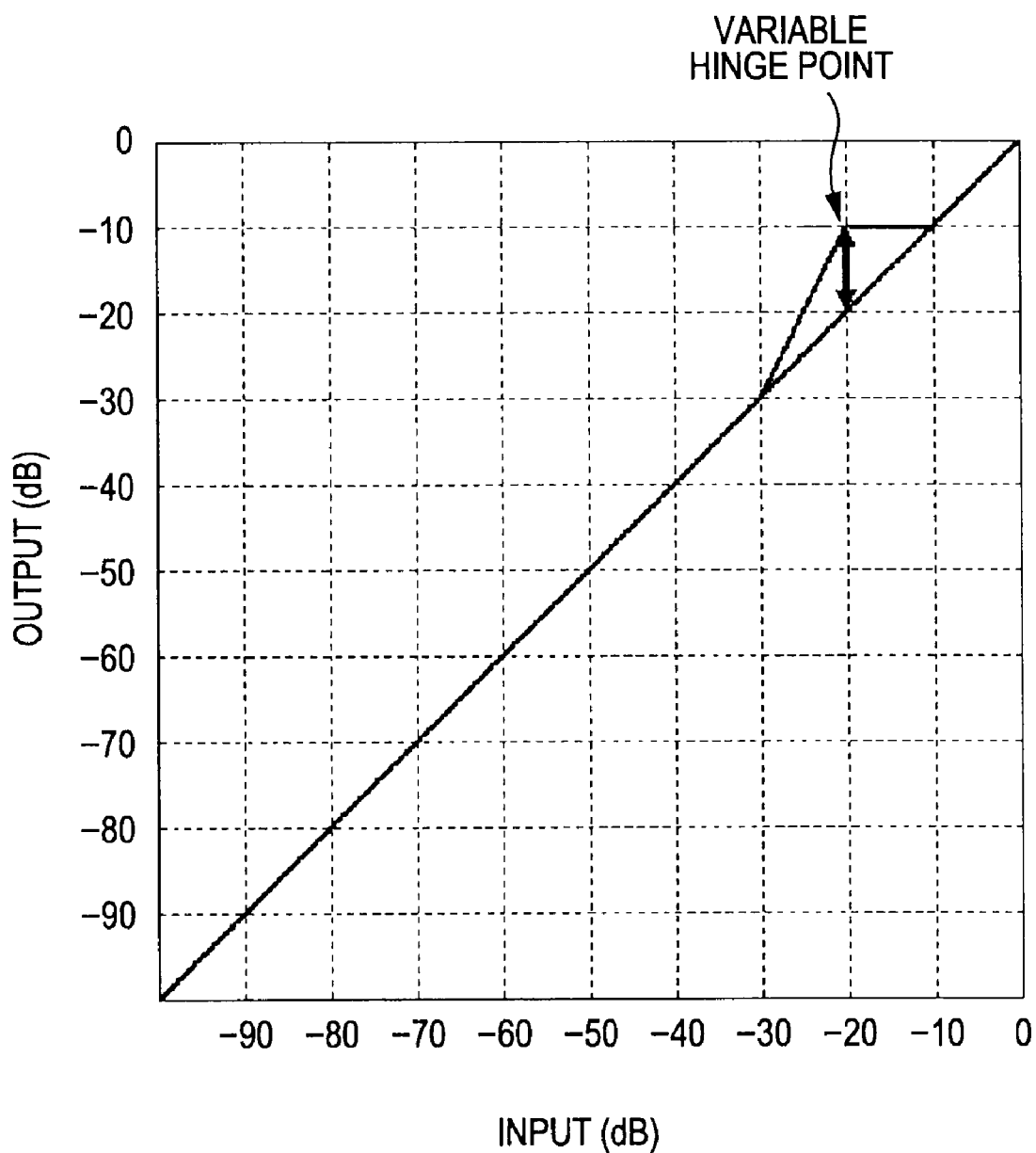
FIG. 17 is a characteristic diagram of input and output characteristic curves of an auto level controller having a variable hinge point according to the present embodiment.
Figure 18:
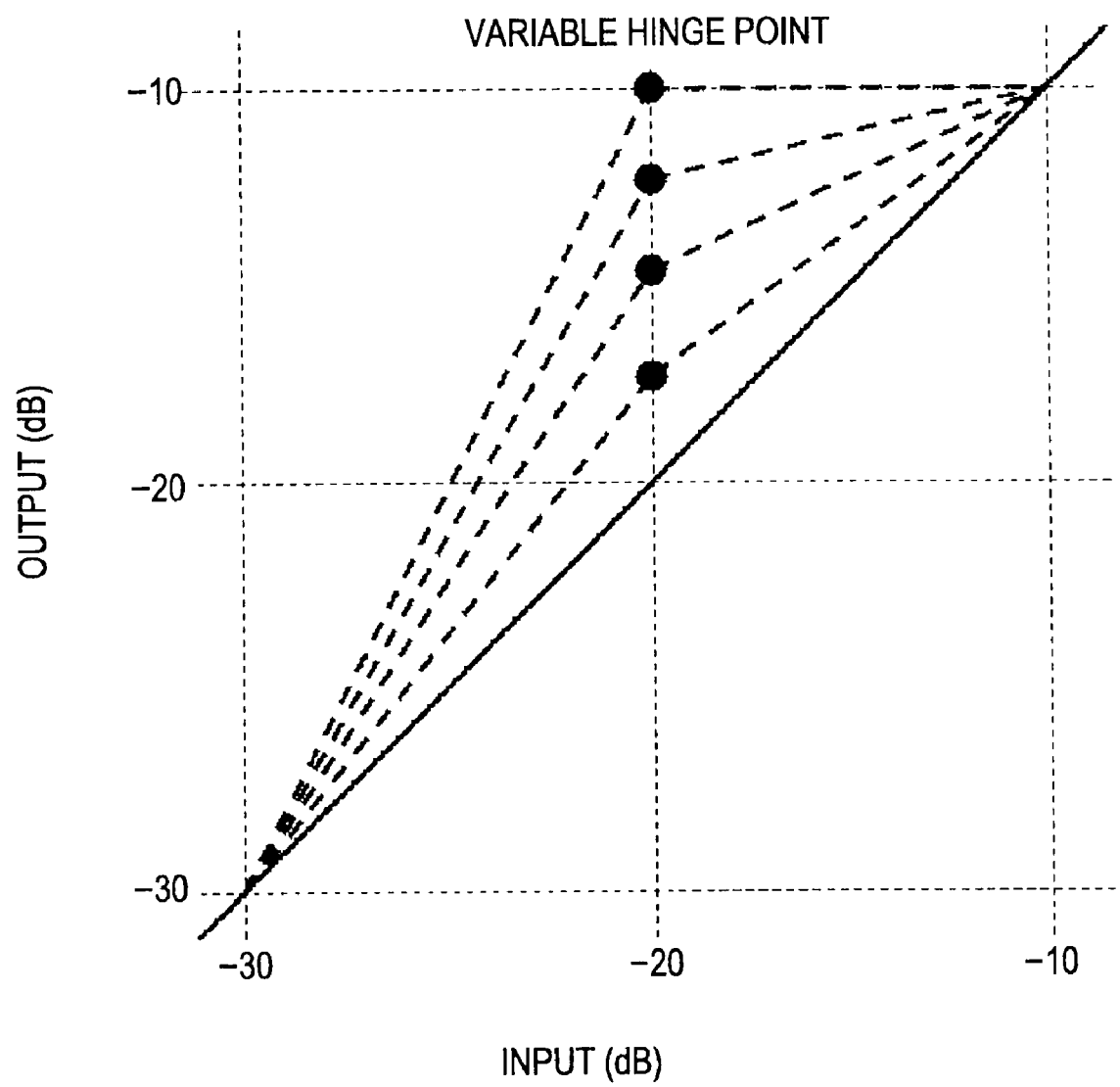
FIG. 18 is a characteristic diagram in which a vicinity of the variable hinge point of FIG. 17 is expanded.
Figure 19:
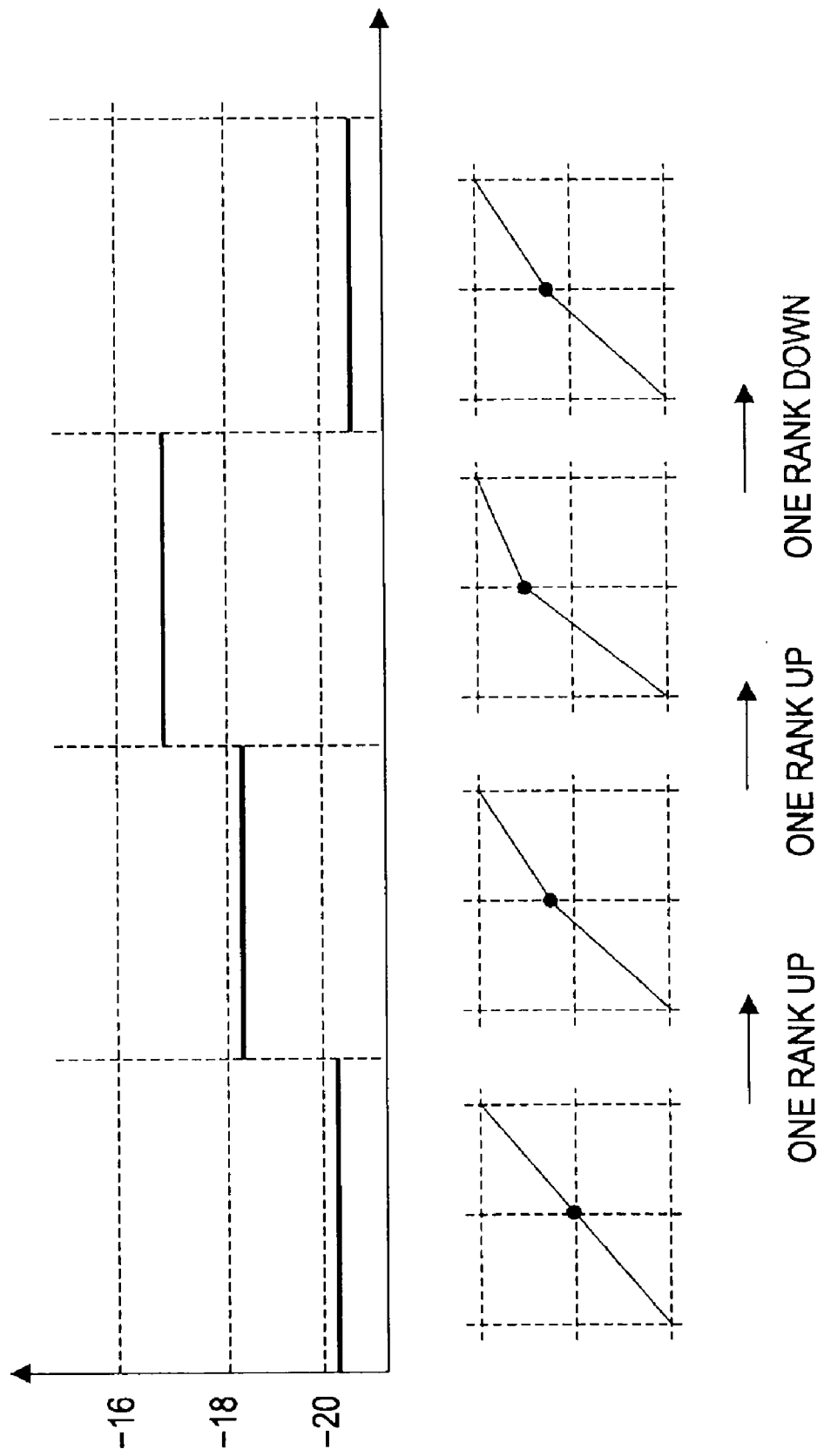
FIG. 19 is a diagram used for describing a relation between a level change of the control signal and a change of the variable hinge point.

Herein, the general auto level controller (ALC) is configured to have a characteristic in which the input and output characteristic curve is decided as one curve, and the input level and the output level correspond to one to one. In contrast to this, the auto level controller 49 provided to the incoming call audio processing unit 24 according to the present embodiment is configured to be able to change the input and output characteristics themselves on the basis of the control signal shown in FIG. 16. To be more specific, the auto level controller 49 according to the present embodiment is configured to have the input and output characteristics having a variable hinge point as shown in FIGS. 17 to 19. It should be noted that FIG. 18 is a diagram expanding the vicinity of the variable hinge point of FIG. 17. Also, FIG. 19 shows a relation between the level change of the control signal and the change of the variable hinge point.

That is, as shown in FIGS. 17 and 18, for example, the auto level controller 49 according to the present embodiment can change the value of the output level with respect to the input level in a plurality of stages, for example, every 1 dB up to maximum 10 dB (for example, 11 stages for every step of 1 dB) within a predetermined input level range considered to be the signal level of the incoming call voice due to the human voice (in FIGS. 17 and 18, for example, in a range between −30 dB or higher and the upper limit of −10 dB). As shown in FIG. 19, as the value of the next control signal is higher with respect to the value of the control signal one before, the above-mentioned variable hinge point is shifted by one stage in a direction in which the output level becomes higher (1 rank up). On the other hand, the value of the next control signal is lower with respect to the value of the control signal one before, the level control is carried out so that the above-mentioned variable hinge point is shifted in a direction in which the output level becomes lower (1 rank down).

To be more specific, in a case where the input level is within the predetermined input level, for example, the value of the control signal is large (that is, in a case where the surrounding environment noise is large), the auto level controller 49 according to the present embodiment performs the dynamics control to change the above-mentioned variable hinge point in a direction in which the output level with respect to the input level increased so that the effects of the auto level controller are enhanced. On the other hand, for example, in a case where the value of the control signal is small (that is, in a case where the surrounding environment noise is small), the auto level controller 49 according to the present embodiment performs the dynamics control to change the above-mentioned variable hinge point in a direction in which the output level with respect to the input level approach to the one to one relation so that the effects of the auto level controller are suppressed.

Figure 20:
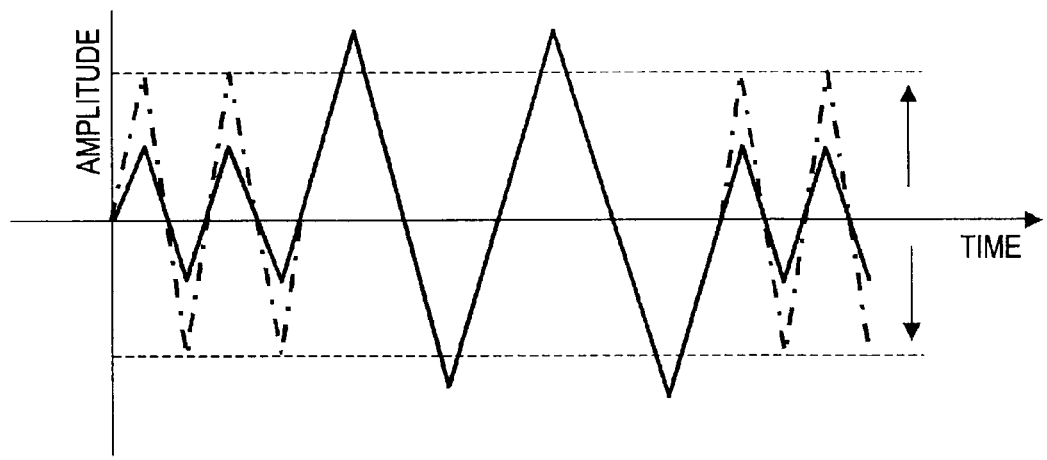
FIG. 20 is a waveform diagram of a schematic amplitude waveform of an incoming call audio signal after the level adjustment by the auto level controller according to the present embodiment.

In other words, in a case where the incoming call audio signal at a certain level or higher is input, the above-mentioned surrounding environment noise is large (that is, when the value of the control signal is large), the auto level controller 49 according to the present embodiment adjusts the input and output characteristics of the auto level controller, for example, in a direction in which the input level:the output level=1:n is established (n in this case is a value higher than 1 and corresponding to the respective variable hinge points for every 1 dB step described above). Thus, for example, as shown in FIG. 20, the output level of the incoming call audio signal is increased, and the hearing of the incoming call audio is facilitated. On the other hand, when the surrounding environment noise is small (that is, when the value of the control signal is small), the input and output characteristics of the auto level controller is adjusted in a direction approaching the input level:the output level=1:1. Thus, the sound quality deterioration of the incoming call voice on the basis of the dynamics control in the auto level controller is suppressed to minimum. It should be noted that the solid line in FIG. 20 represents the amplitude waveform of the actual incoming call audio signal. The dashed-dotted line in FIG. 20 represents the amplitude waveform of the incoming call audio signal when the output level according to the present embodiment is increased.

As described above, according to the present embodiment, for example, in a case where the surrounding environment noise is increased, and the input and output characteristics of the auto level controller 49 are adjusted in a direction approaching the input level:the output level=1:n. Even when some sound quality deterioration is caused in the incoming call audio, the level of the incoming call voice becomes higher relatively with respect to the surrounding environment noise, the incoming call audio becomes easier to hear. On the other hand, in a case where the surrounding environment noise is smaller and the input and output characteristics of the auto level controller 49 is adjusted in a direction of approaching the input level:the output level=1:1, as the level of the incoming call voice does not become higher but the level of the original surrounding environment noise is also low, the possibility is lowered that the surrounding environment noise adversely affects the phone call. Also, as the sound quality deterioration of the incoming call voice is lowered, the incoming call audio becomes easier to hear.

It should be noted that in the above description, as shown in FIGS. 17 and 18, the variable hinge point has been described as an example in which the value of the output level with respect to the input level can be changed in a plurality of stages, for example, for every 1 dB up to maximum 10 dB. However, the variable hinge point is not only one changing in a discontinuous manner but also may be one changing in a continuous manner, for example.

Also, in the above-mentioned example, to simplify the description, the case has been described in which the dynamics control based on the variable hinge point in the auto level controller 49 is carried out while directly following the change in the size of the ambient environment noise. However, for example, in a case where the ambient environment noise is drastically changed, the incoming call audio after the above-mentioned dynamics control may drastically change in such a manner that the user feels sense of discomfort in the hearing. For this reason, in order to avoid the above-mentioned drastic change, for example, the dynamics control in the auto level controller 49 according to the present embodiment is designed to prepare a hysteresis at a certain level with respect to the change in the variable hinge point.

Also, in FIGS. 17 and 18 described above, the example has been described in which for the characteristic curve at the part where the input and output characteristics of the auto level controller 49 are changed, the characteristic curve bending at the part of the certain predetermined input level (in the example of FIGS. 17 and 18, the input level of −20 dB) (the characteristic curve of the variable hinge point) is used. However, for example, as shown in FIG. 21, it is also possible to use the characteristic curve changing in a plurality of stages (discontinuous manner) or a continuous manner in a state in which a line segment is provided while which is in parallel with the input level and the output level curve corresponding to one to one and also has a certain length.

Figure 21:
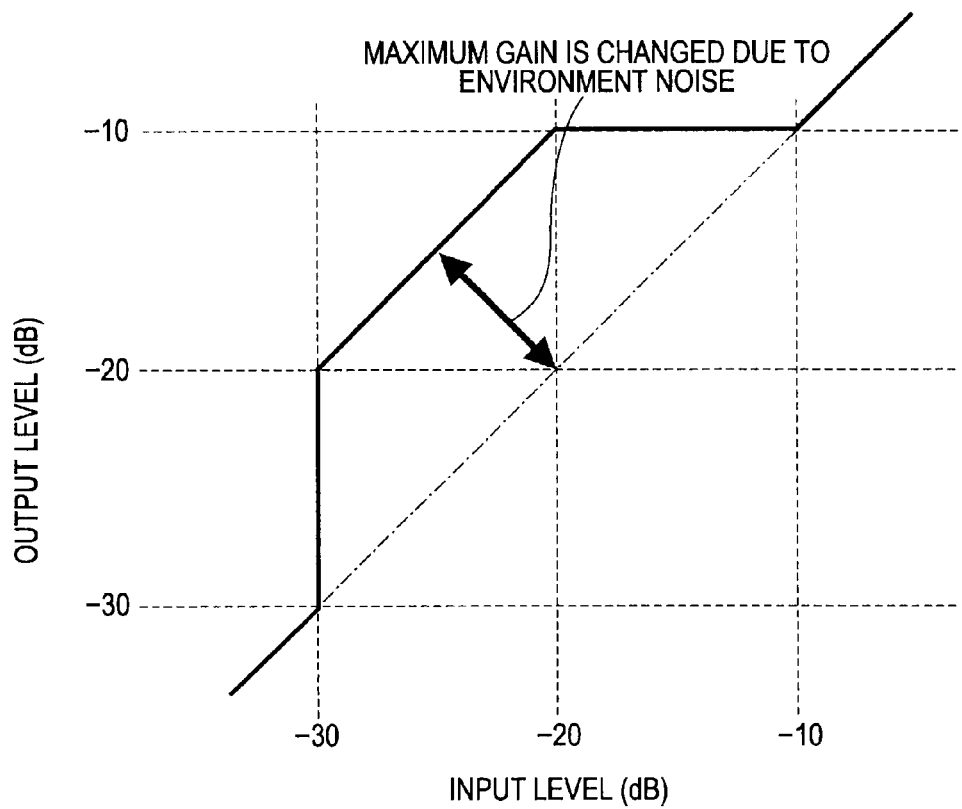
FIG. 21 is a characteristic diagram used for describing an example in which the input and output characteristics are changed in a state of having a line segment in parallel with the input and output characteristic curves of the auto level controller in which the input level and the output level correspond to one to one.

That is, in the case of the example of FIG. 21, the auto level controller 49 can change the value of the output level with respect to the input level for every 1 dB in a plurality of stages (for example, 11 stages in units of 1 dB) up to, for example, 10 dB within the predetermined input level range considered to be the signal level of the incoming call voice due to the human voice. When the value of the next control signal is higher with respect to the value of the control signal one before, the dynamics control is performed so that the gain is shifted by one stage in a direction in which the output level becomes higher. On the other hand, when the value of the next control signal is lower with respect to the value of the control signal one before, the dynamics control is performed so that the gain is shifted in a direction in which the output level becomes lower. In the case of the example of FIG. 21, as only the input and output characteristic curve which the auto level controller 49 originally has is shifted in parallel, the number of the changes in the circuit configuration is small, and it is therefore possible to easily realize the circuit at a low cost. It should be noted that at the time of the dynamics control, for example, the input and output level is detected, and also an attack time for adjusting the gain (a time when the gain is decreased) and a recovery time (a time when the gain is increased) are prepared. It is desired that the attack time and the recovery time are adjusted in accordance with the detection value of the above-mentioned input and output level so that the change in the gain is not drastic.

Also, the case of the analog processing has been exemplified in the above description. However, in addition, for example, in a case where a digital processing is used, a relation shown in, for example, FIGS. 22 and 23 is established between the control signal and the variable hinge point, and the certain time interval (for example, 100 msec interval). Each time the control signal is input, the comparison is performed between the value of the control signal corresponding to the variable hinge point at the relevant time and the above-mentioned control signal. When the value of the input control signal is higher, the variable hinge point may be shifted by one stage in the direction in which the output becomes higher. On the other hand, when the value of the input control signal is lower, the variable hinge point may be shifted in the direction in which the output becomes lower. With such a configuration, even in the case of using the digital processing, the drastic change in the variable hinge point can be prevented.

According to the present embodiment, as the above-mentioned procedure is performed, without increasing the processing amount, the ease of hearing the voice on the phone call under the ambient environment noise can be improved.

Description for the Configuration and Operation of the Formant Adjustment Unit

Next, the formant adjustment unit 40 of the incoming call audio processing unit 24 will be described.

Figure 15:
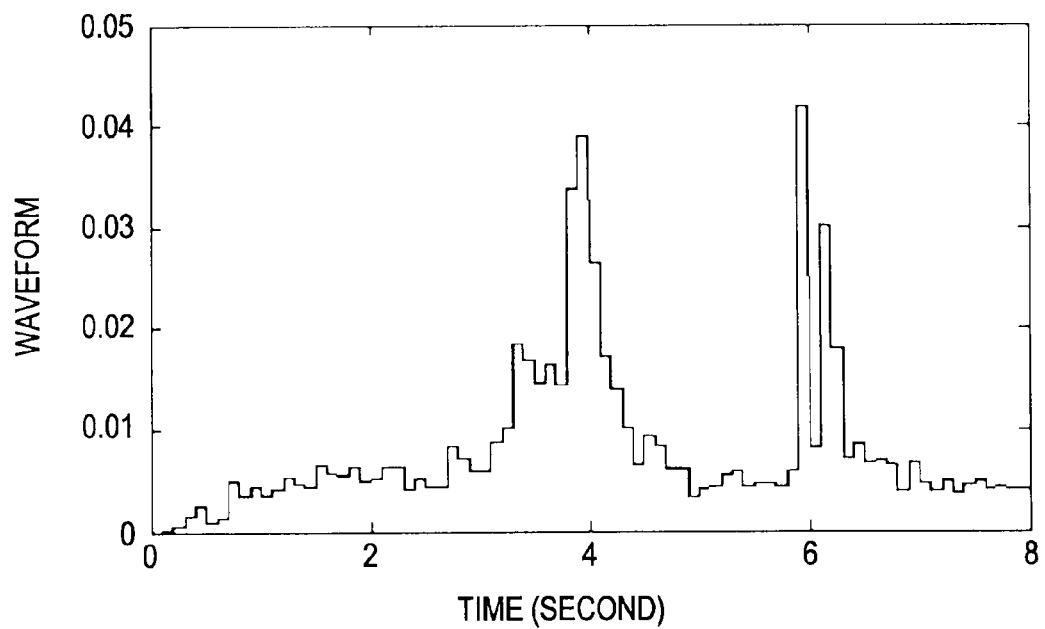
FIG. 15 is a waveform diagram of a waveform example of a control signal (a signal representing a rough energy transient of the ambient environment noise) output from the noise detection unit.
Figure 24:
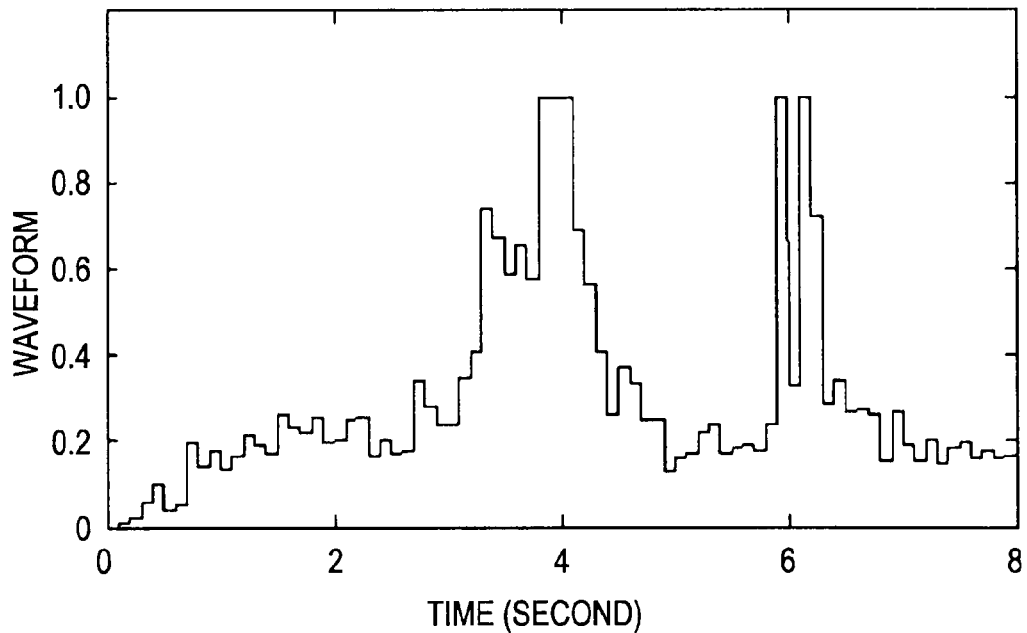
FIG. 24 is a waveform diagram of a signal waveform after the control signal of FIG. 15 output from the noise detection unit passes through a limiter and an amplifier of a formant adjustment unit.

The control signal output from the comparator 66 of the incoming call audio processing unit 24 is subjected to the level limit by a limiter 41 of the formant adjustment unit 40 for a part exceeding the regulated level and is further subjected to the level adjustment by an amplifier 42 as the occasion demands to be thereafter sent to an amplifier 43 as a control signal. It should be noted that in a case where the signal waveform of the control signal output from the comparator 66 is, for example, the above-mentioned waveform as shown in FIG. 15, the control signal waveform after the level limit by the limiter 41 of the formant adjustment unit 40 is applied, and the level adjustment is performed in the amplifier 42 has a waveform shown, for example, in FIG. 24.

Figure 25:
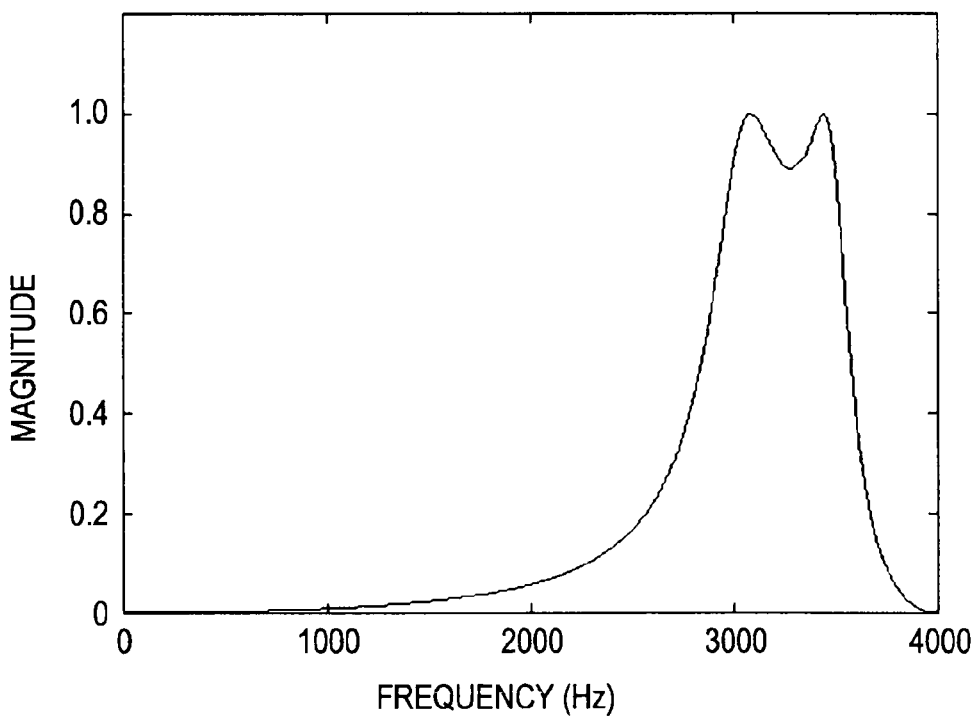
FIG. 25 is a characteristic diagram of a frequency characteristic of a band-pass filter of the formant adjustment unit.
Figure 26:
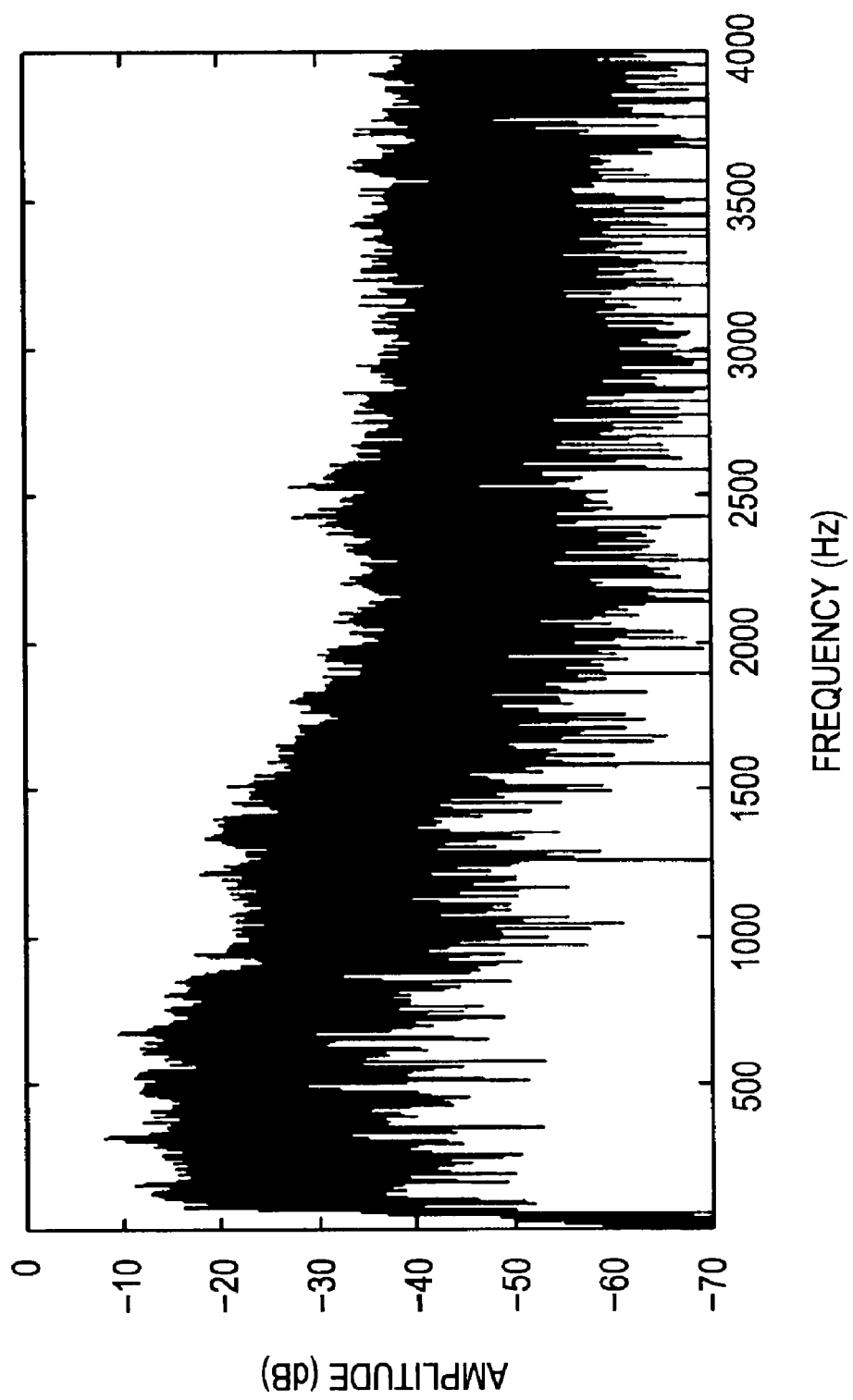
FIG. 26 is an amplitude-frequency measurement diagram obtained by actually measuring the incoming call audio signal input from an incoming call audio signal input terminal.
Figure 27:
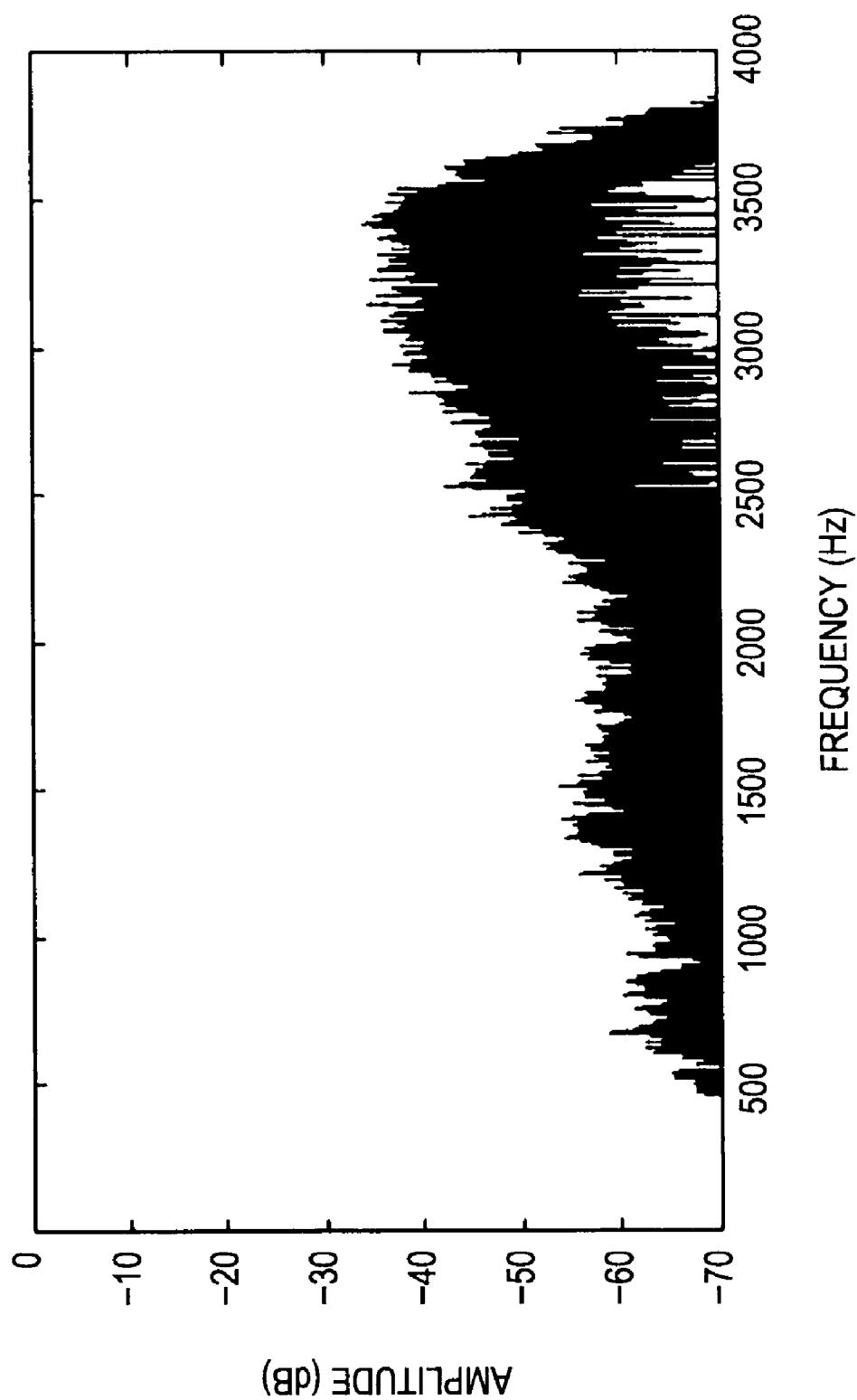
FIG. 27 is an amplitude-frequency measurement diagram obtained by actually measuring the incoming call audio signal after a band pass processing by the band-pass filter of the formant adjustment unit.

Also, the band-pass filter 44 to which the incoming call audio signal from the incoming call audio input terminal 45 is input is a filter provided with a frequency characteristic shown, for example, in FIG. 25. That is, the band-pass filter 44 is a filter allowing only the frequency band of the second formant which is hardly overlapped with the peak of the ambient environment noise, in particular, among the frequency bands of the incoming call audio signal. It should be noted that FIG. 26 shows an amplitude-frequency measurement diagram obtained by actually measuring the incoming call audio signal input from the incoming call audio signal input terminal 45, and FIG. 27 shows an amplitude-frequency measurement diagram obtained by actually measuring the incoming call audio signal after a band pass processing by the band-pass filter 44.

The incoming call audio signal in the frequency band of the second formant passing through the band-pass filter 44 is input to the amplifier 43.

Figure 28:
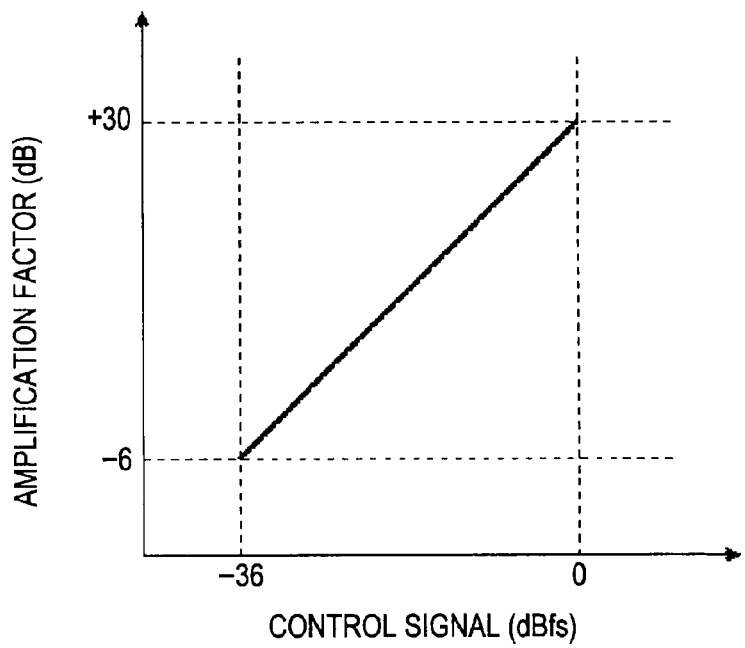
FIG. 28 is a characteristic diagram of a relation between the control signal in the amplifier of the formant adjustment unit and an amplification factor.
Figure 29:
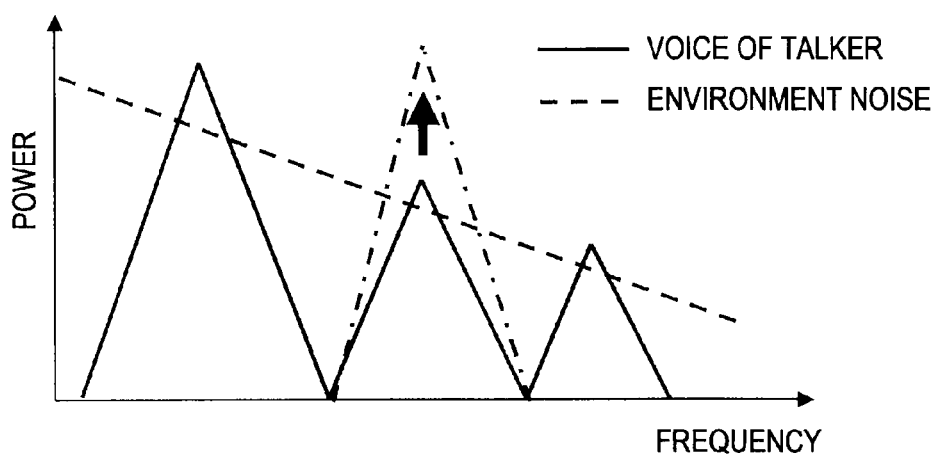
FIG. 29 is a schematic diagram used for describing a state in which the frequency characteristic of the second formant in the frequency characteristic of the human voice is adjusted by the formant adjustment unit.
Figure 30:
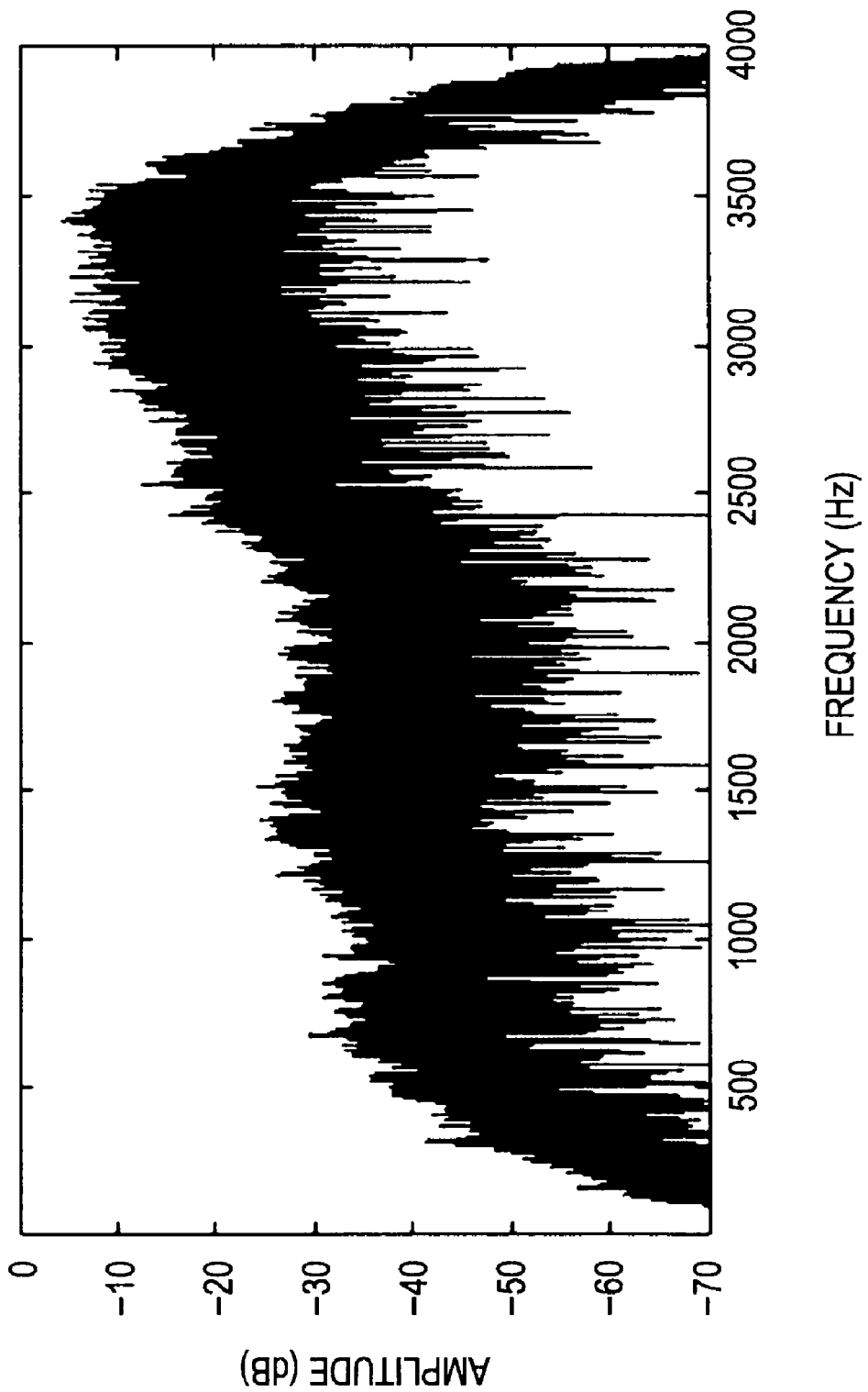
FIG. 30 is an amplitude-frequency measurement diagram obtained by actually measuring the incoming call audio signal after a gain adjustment by the amplifier of the formant adjustment unit.

Herein, the amplifier 43 is composed of an amplifier having a relation of an amplification factor shown in FIG. 28 with respect to the control signal. With this configuration, in the amplifier 43, like the characteristic curve indicated by the dashed-dotted line in FIG. 29 similarly as in FIG. 3 described above, with respect to the signal in the frequency band of the second formant in the incoming call audio signal, the gain adjustment processing (emphasis processing) of FIG. 28 in accordance with the relation between the control signal and the amplification factor is carried out. It should be noted that FIG. 30 shows an amplitude-frequency measurement diagram obtained by actually measuring the incoming call audio signal after the gain adjustment by the amplifier 43.

Then, the output signal of the amplifier 43 is sent to the adder 46.

Also, the adder 46 is supplied with the incoming call audio signal after the delay and phase adjustment by the delay phase shifter unit 47. It should be noted that the delay phase shifter unit 47 is installed for providing a delay similar to the delay in the band-pass filter 44 of the formant adjustment unit 40, to the incoming call audio signal which is input to the incoming call audio input terminal.

Figure 31:
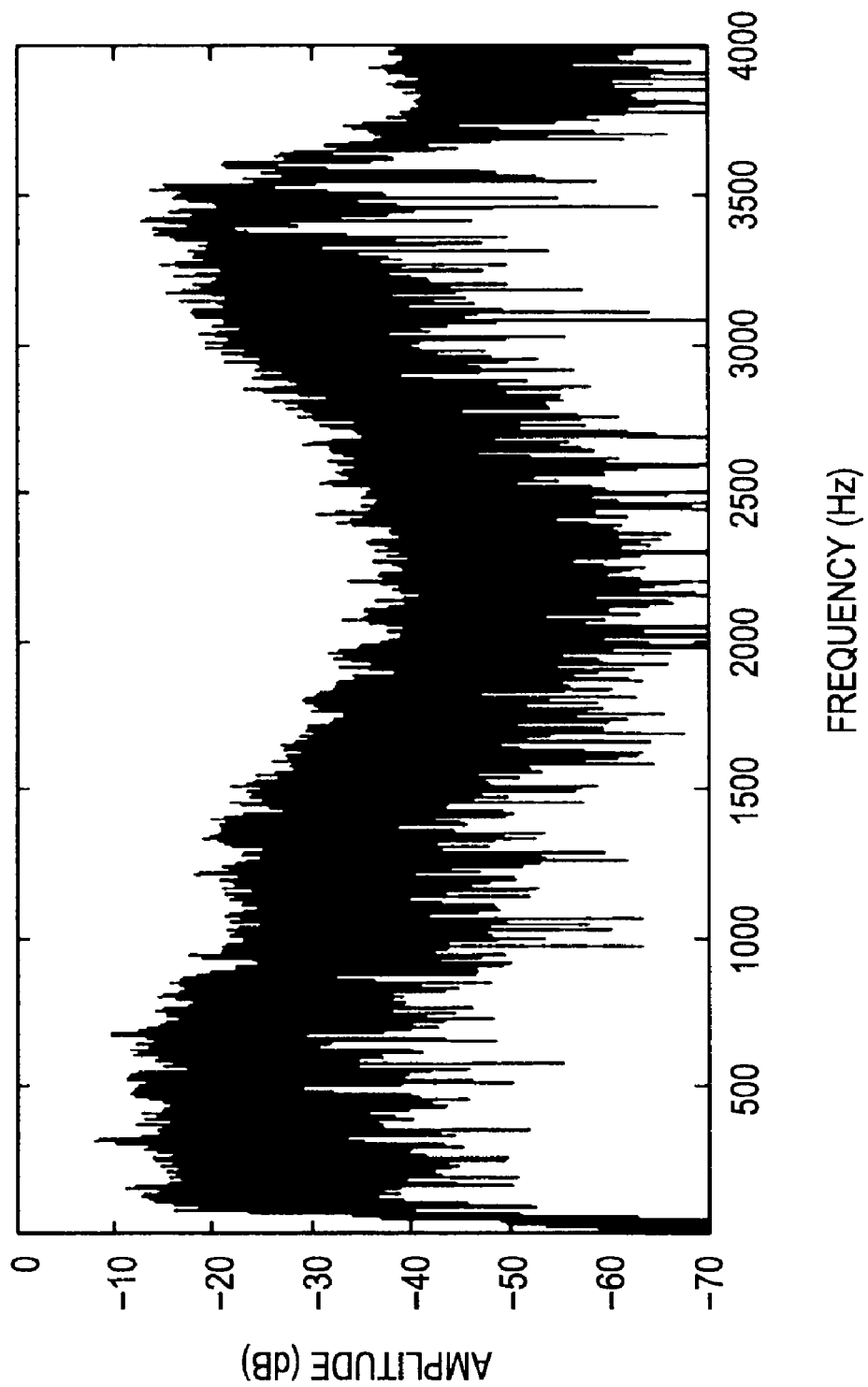
FIG. 31 is an amplitude-frequency measurement diagram obtained by actually measuring the incoming call audio signal after an addition processing by an adder of the formant adjustment unit.

In the adder 46, the incoming call audio signal after the time and phase adjustment by the delay phase shifter unit 47, the output signal of the amplifier 43 (that is, the signal on which the gain adjustment of the second formant is performed) is added. That is, the output signal of the adder 46 is a signal on which, as shown in FIG. 29 described above, the processing is performed for emphasizing the second formant whose band is hardly overlapped with the peak of the ambient environment noise, in particular, among the formants included in the incoming call audio signal. It should be noted that FIG. 31 shows an amplitude-frequency measurement diagram obtained by actually measuring the incoming call audio signal after the addition processing by the adder 46.

Then, the signal output from the adder 46 is sent to the amplifier 48 of the above-mentioned dynamics adjustment unit 50.

Another Configuration Example of Noise Detection Unit

Figure 32:
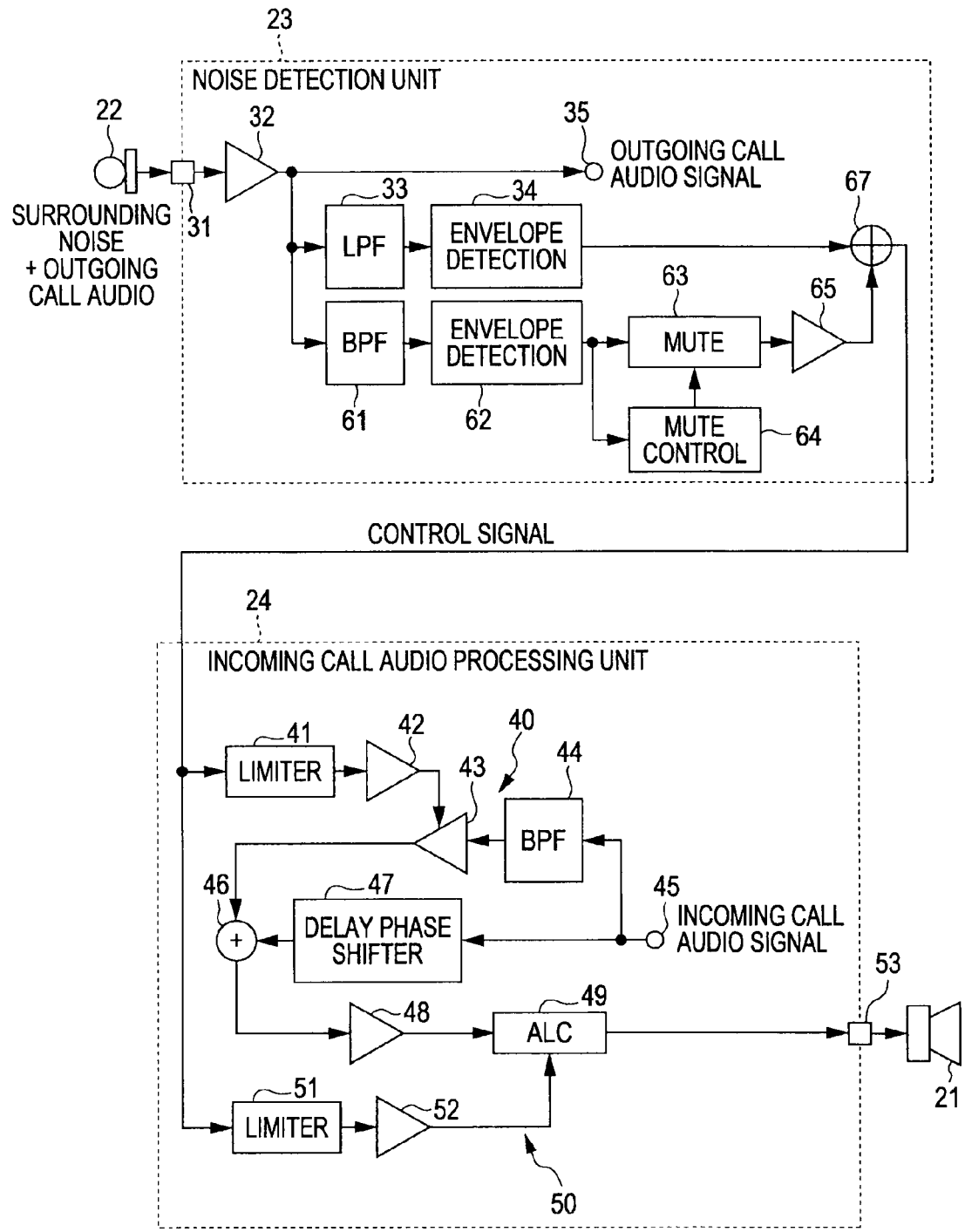
FIG. 32 is a block diagram used for describing another schematic configuration example of the noise detection unit provided in the audio processing unit of the mobile phone terminal according to the present embodiment.

FIG. 32 shows another configuration example of the noise detection unit 23 provided in the audio processing unit 20 of the mobile phone terminal according to the present embodiment. It should be noted that in FIG. 32, the same reference numerals are assigned to the same components as the above-described respective components of FIG. 2, and a description thereof will be omitted.

In this configuration example of FIG. 32, in the noise detection unit 23, instead of the comparator 66 shown in FIG. 2, an adder 67 is provided.

That is, in FIG. 32, the adder 67 is supplied with the output signal of the envelope detector 34 on the branch path on the low-pass filter 33 side described above and the output signal of the mixing volume circuit 66 on the branch path on the band-pass filter 61 side described above.

In the adder 67, the output signal of the envelope detector 62 via the mute circuit 63 in the branch path on the band-pass filter 61 side and the output signal of the envelope detector 34 in the branch path on the low-pass filter 33 side are added.

Then, in this example of FIG. 32, an addition signal from the adder 67 is output to the incoming call audio processing unit 24 in a later stage as the control signal.

According to this configuration example of FIG. 32, a signal obtained by adding the control signal based on the ambient environment noise from which the human voice is substantially removed in the branch path on the low-pass filter 33 side to the control signal based on the ambient environment noise due to the voice of other people in the branch path on the band-pass filter 61 side is output as the control signal to the incoming call audio processing unit 24.

That is, according to this configuration example of FIG. 32, in a period in which the voice of the talker on the phone call does not exists, in a case where the ambient environment noise due to the voice of other people exists, the control signal is generated in which the ambient environment noise due to the voice of other people and the ambient environment noise from which the human voice is substantially removed are both taken into account.

Therefore, according to the example of FIG. 32, in the incoming call audio processing unit 24, the adjustment is performed on the basis of both the ambient environment noise due to the voice of the other people and the ambient environment noise from which the human voice is substantially removed, the level of the incoming call audio signal.

Of course, in the case of this example too, as described above, in the incoming call audio processing unit 24, while utilizing the promptness of the level adjustment response speed based on the control signals regularly generated from the ambient environment noise from which the human voice is substantially removed, the level adjustment by the ambient environment noise due to the human voice can also be performed.

As described above, according to the present embodiment, the processing is performed for controlling the input and output characteristics (dynamics) of the incoming call audio signal sent from the other party of the phone call by utilizing both the ambient environment noise from which the human voice is substantially removed and the ambient environment noise caused by the voice of the surrounding other people except for the voice of the talker during the phone call.

Therefore, according to the present embodiment, even for the use under not only the general various use environments but also, for example, the environment where the human voice becomes the noise source such as the party venue or the pub, it is possible to make it easier to hear the incoming call audio.

Also, the processing for controlling the dynamics of the incoming call audio signal in accordance with the size of the ambient environment noise can be realized at the extremely small processing amount only including the low-pass filter, the envelope detection, and the auto level control.

Furthermore, according to the present embodiment, the dynamics control is performed on the incoming call audio signal, and at the same time, the processing is performed for emphasizing the second formant whose band is hardly overlapped with the peak of the ambient environment noise, in particular, among the formants included in the incoming call audio signal (the processing for lifting up the contour components of the voice on the incoming call), so that it is possible to make it more easier to hear the incoming call audio.

It should be noted that the description according to the above-mentioned embodiment is an example of the present invention. For this reason, the present invention is not limited to the above-mentioned respective embodiments, and various modifications can of course be made in accordance with the design and the like without departing from the technical idea according to the present invention.

For example, according to the above-mentioned embodiment, the mobile terminal such as the mobile phone terminal is exemplified, but the present invention can also be applied to a fixed-line communication terminal such as a land line. In addition, the present invention can also be applied to various mobile terminals such as, for example, a PDA provided with a voice call function (Personal Digital Assistants).

The present application contains subject matter related to that disclosed in Japanese Priority Patent Application JP filed in the Japan Patent Office on Sep. 1, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal processing apparatus comprising:
a band signal component extraction unit including a filter designed to extract a signal waveform in a predetermined frequency band from an audio signal input by audio collection means configured to collect at least an outgoing call audio upon an audio phone call, and a first envelope detector configured to detect an envelope of a signal waveform after pass of the filter and to output the signal waveform after the envelope detection as signal components in the predetermined frequency band;
a stationary signal component extraction unit configured to extract at least a stationary signal component from the signal components extracted by the band signal component extraction unit;
a signal adjustment unit provided with a level adjustment function of adjusting an output signal level with respect to an input signal level and an input and output characteristics change function for changing the input and output characteristics on the basis of a control signal when performing the level adjustment in the level adjustment function, and configured to set an incoming call audio signal upon the audio phone call as the input signal; and
a control signal generation unit configured to generate the control signal for changing the input and output characteristics of the signal adjustment unit by using at least the stationary signal component extracted by the stationary signal component extraction unit wherein
the stationary signal component extraction unit includes a mute unit configured to mute the signal waveform after the envelope detection and a mute control unit configured to cancel mute of the mute unit when a signal level of the signal waveform after the envelope detection exceeds a predetermined threshold and also this state carries on for a predetermined period of time and to enable the mute of the mute unit when the signal level dips from the predetermined threshold after the mute cancellation, and the control signal generation unit uses at least the stationary signal component composed of a signal waveform output from the mute unit to generate the control signal.

2. The audio signal processing apparatus according to claim 1,
wherein the band signal component extraction unit extracts signal components in a first frequency band and signal components in a second frequency band as the signal components in the predetermined frequency band,
wherein the stationary signal component extraction unit extracts the stationary signal component from the signal components in the first frequency band among the signal components in the predetermined frequency band, and
wherein the control signal generation unit compares a signal level of the stationary signal component extracted from the signal components in the first frequency band by the stationary signal component extraction unit with a signal level of the signal components in the second frequency band extracted by the band signal component extraction unit and uses the signal components at the higher one of the signal level to generate the control signal.

3. The audio signal processing apparatus according to claim 1,
wherein the band signal component extraction unit extracts signal components in a first frequency band and signal components in a second frequency band as the signal components in the predetermined frequency band,
wherein the stationary signal component extraction unit extracts the stationary signal component from the signal components in the first frequency band among the signal components in the predetermined frequency band, and
wherein the control signal generation unit uses signal components obtained by adding the stationary signal component extracted from the signal components in the first frequency band by the stationary signal component extraction unit with the signal components in the second frequency band extracted by the band signal component extraction unit to generate the control signal.

4. The audio signal processing apparatus according to claim 2 or 3,
wherein the band signal component extraction unit extracts signal components in a band of a human voice as the first frequency band and extracts signal components in a frequency band other than the band of the human voice as the second frequency band.

5. The audio signal processing apparatus according to any one of claims 2 to 3,
wherein the band signal component extraction unit includes a first filter designed to extract a signal waveform in the first frequency band from an input audio signal, a second filter designed to extract a signal waveform in the second frequency band from the input audio signal, a first envelope detector configured to detect an envelope of a signal waveform after pass of the first filter, and a second envelope detector configured to detect an envelope of a signal waveform after pass of the second filter, outputs a signal waveform after the envelope detection by the first envelope detector as the signal components in the first frequency band, and outputs a signal waveform after the envelope detection by the second envelope detector as the signal components in the second frequency band,
wherein the stationary signal component extraction unit includes the mute unit configured to mute the signal waveform after the envelope detection by the first envelope detector and the mute control unit configured to cancel mute of the mute unit when a signal level of the signal waveform after the envelope detection exceeds the predetermined threshold and also this state carries on for a predetermined period of time and to enable the mute of the mute unit when the signal level dips from the predetermined threshold after the mute cancellation and outputs an output waveform of the mute unit as the stationary signal component, and
wherein the control signal generation unit uses the stationary signal component composed of a signal waveform output from the mute unit and the signal components in the second frequency band composed of the signal waveform after the envelope detection by the second envelope detector to generate the control signal.

6. The audio signal processing apparatus according to claim 1,
wherein when a value of the signal level of the signal components is higher than a regulated value, the control signal generation unit generates the control signal for changing the input and output characteristics of the signal adjustment unit from the signal components in a direction in which the output signal level becomes higher with respect to the input signal level.

7. The audio signal processing apparatus according to claim 6,
wherein when the value of the signal level of the signal components is changed in a diminishing direction, the control signal generation unit generates the control signal for changing the input and output characteristics of the signal adjustment unit from the signal components in a direction a relation between input signal level and the output signal level approaches to one to one.

8. The audio signal processing apparatus according to claim 6,
wherein the signal adjustment unit changes the input and output characteristics on the basis of the control signal stepwise or continuously.

9. The audio signal processing apparatus according to claim 6,
wherein the signal adjustment unit allows a hysteresis in the change of the input and output characteristics on the basis of the control signal.

10. The audio signal processing apparatus according to claim 6,
wherein the signal adjustment unit has a formant adjustment function of emphasizing a formant component included in an incoming call audio signal upon the audio phone call and sets an incoming call audio signal after an adjustment processing on a predetermined formant component through the formant adjustment function as the input signal.

11. An audio signal processing method comprising the steps of:
extracting a signal waveform in a predetermined frequency band by a band signal component extraction unit including a filter designed to extract the signal waveform from an audio signal input by audio collection means configured to collect at least an outgoing call audio upon an audio phone call and detecting an envelope of a signal waveform after pass of the filter by an envelope detector and outputting the signal waveform after the envelope detection as the signal components in the predetermined frequency band;
extracting at least a stationary signal component by a stationary signal component extraction unit from the signal components extracted by the band signal component extraction unit;

generating a control signal for changing input and output characteristics of the signal adjustment unit by a control signal generation unit by using at least the stationary signal component extracted by the stationary signal component extraction unit;

setting an incoming call audio signal upon the audio phone call as an input signal, and by a signal adjustment unit on the basis of the control signal generated by the control signal generation unit, changing the input and output characteristics for adjusting an output signal level with respect to an input signal level to adjust a level of the incoming call audio signal;

muting the signal waveform after the envelope detection by a mute unit of the stationary signal component extraction unit and cancelling mute of the mute unit by a mute control unit when a signal level of the signal waveform after the envelope detection exceeds a predetermined threshold and also this state carries on for a predetermined period of time and enabling the mute of the mute unit when the signal level dips from the predetermined threshold after the mute cancellation; and using by the control signal generation unit at least the stationary signal component composed of a signal waveform output from the mute unit to generate the control signal.

12. A communication terminal comprising:

a communication unit configured to perform a communication for at least an audio phone call;

an audio collection unit configured to collect at least an outgoing call audio upon the audio phone call;

an audio emission unit configured to convert an incoming call audio signal upon the audio phone call into an acoustical wave to be output;

a band signal component extraction unit including a filter designed to extract a signal waveform in a predetermined frequency band from the audio signal input by the audio collection unit, and an envelope detector configured to detect an envelope of a signal waveform after pass of the filter and to output the signal waveform after the envelope detection as signal components in the predetermined frequency band;

a stationary signal component extraction unit configured to extract at least a stationary signal component from the signal components extracted by the band signal component extraction unit;

a signal adjustment unit provided with a level adjustment function of adjusting an output signal level with respect to an input signal level and an input and output characteristics change function for changing the input and output characteristics on the basis of a control signal when performing the level adjustment in the level adjustment function, and configured to set the incoming call audio signal upon the audio phone call as the input signal; and a control signal generation unit configured to generate the control signal for changing the input and output characteristics of the signal adjustment unit by using at least the stationary signal component extracted by the stationary signal component extraction unit, wherein the stationary signal component extraction unit includes a mute unit configured to mute the signal waveform after the envelope detection and a mute control unit configured to cancel mute of the mute unit when a signal level of the signal waveform after the envelope detection exceeds a predetermined threshold and also this state carries on for a predetermined period of time and to enable the mute of the mute unit when the signal level dips from the predetermined threshold after the mute cancellation, the control signal generation unit uses at least the stationary signal component composed of a signal waveform output from the mute unit to generate the control signal, and the incoming call audio signal output from the signal adjustment unit is supplied to the audio emission unit.

13. An audio signal processing apparatus comprising:

a band signal component extraction unit including a filter designed to extract a signal waveform in a predetermined frequency band from an audio signal input by an audio collection section configured to collect at least an outgoing call audio upon an audio phone call, and an envelope detector configured to detect an envelope of a signal waveform after pass of the filter and to output the signal waveform after the envelope detection as signal components in the predetermined frequency band;

a stationary signal component extraction unit configured to extract at least a stationary signal component from the signal components extracted by the band signal component extraction unit;

a signal adjustment unit provided with a level adjustment function of adjusting an output signal level with respect to an input signal level and an input and output characteristics change function for changing the input and output characteristics on the basis of a control signal when performing the level adjustment in the level adjustment function, and configured to set an incoming call audio signal upon the audio phone call as the input signal; and a control signal generation unit configured to generate the control signal for changing the input and output characteristics of the signal adjustment unit by using at least the stationary signal component extracted by the stationary signal component extraction unit, wherein the stationary signal component extraction unit includes a mute unit configured to mute the signal waveform after the envelope detection and a mute control unit configured to cancel mute of the mute unit when a signal level of the signal waveform after the envelope detection exceeds a predetermined threshold and also this state carries on for a predetermined period of time and to enable the mute of the mute unit when the signal level dips from the predetermined threshold after the mute cancellation, and the control signal generation unit uses at least the stationary signal component composed of a signal waveform output from the mute unit to generate the control signal.

* * * * *